(12) United States Patent
Stoner et al.

(10) Patent No.: US 8,950,249 B2
(45) Date of Patent: Feb. 10, 2015

(54) FAULT DETECTION AND MITIGATION IN HYBRID DRIVE SYSTEM

(71) Applicant: Eaton Corporation, Cleveland, OH (US)

(72) Inventors: Michael Anthony Stoner, Eden Prairie, MN (US); Thomas D. Hawkins, Eden Prairie, MN (US); Douglas D. Simpson, Waconia, MN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 13/959,350

(22) Filed: Aug. 5, 2013

(65) Prior Publication Data

US 2013/0317716 A1    Nov. 28, 2013

Related U.S. Application Data

(62) Division of application No. 12/814,303, filed on Jun. 11, 2010, now Pat. No. 8,499,616.

(60) Provisional application No. 61/186,136, filed on Jun. 11, 2009.

(51) Int. Cl.

| F02D 29/02 | (2006.01) |
|---|---|
| G01R 31/28 | (2006.01) |
| F02D 41/22 | (2006.01) |
| F04B 49/10 | (2006.01) |
| G01M 3/00 | (2006.01) |
| B60K 6/12 | (2006.01) |
| B60W 20/00 | (2006.01) |

(Continued)

(52) U.S. Cl.
CPC ............... *F02D 29/02* (2013.01); *F02D 41/22* (2013.01); *F04B 49/103* (2013.01); *G01M 3/002* (2013.01); *G01M 6/26* (2013.01); *B60K 6/12* (2013.01); *B60W 20/50* (2013.01); *B60W 10/02* (2013.01); *F02D 2041/1432* (2013.01); *F02D 2041/224* (2013.01); *F02D 2041/225* (2013.01); *F02D 2041/227* (2013.01); *Y02T 10/6208* (2013.01)
USPC ........................... 73/115.01; 73/37; 73/114.25

(58) Field of Classification Search
USPC ..................... 73/37, 114.25, 115.01
See application file for complete search history.

(56) References Cited

U.S. PATENT DOCUMENTS

| 4,721,327 A | 1/1988 | Chauveau et al. |
|---|---|---|
| 5,000,052 A | 3/1991 | Sipin |

(Continued)

FOREIGN PATENT DOCUMENTS

| WO | WO 2006/017121 A2 | 2/2006 |
|---|---|---|
| WO | WO 2009/019415 A2 | 2/2009 |

OTHER PUBLICATIONS

International Search Report and Written Opinion mailed Jul. 31, 2012.

*Primary Examiner* — Freddie Kirkland, III

(74) *Attorney, Agent, or Firm* — Merchant & Gould P.C.

(57) ABSTRACT

Fault detection and response systems and processes can be used for pumps, e.g., pump/motors used in hybrid vehicles. The fault detection systems determine when certain operating conditions, which may affect the proper operation of the system, occur. The response systems take appropriate action based on which fault conditions are triggered. Example fault detection systems and processes include detection systems for different types of leaks, sensor malfunctions, or operation errors.

20 Claims, 32 Drawing Sheets

(51) Int. Cl.
  *B60W 10/02* (2006.01)
  *F02D 41/14* (2006.01)

(56) References Cited

U.S. PATENT DOCUMENTS

| | | | |
|---|---|---|---|
| 5,845,559 A | 12/1998 | Schroeder et al. | |
| 6,279,383 B1 | 8/2001 | Balke et al. | |
| 6,832,504 B1 | 12/2004 | Birkmann | |
| 6,840,222 B2 | 1/2005 | Schilling et al. | |
| 6,971,232 B2 * | 12/2005 | Singh | 60/414 |
| 7,004,018 B2 * | 2/2006 | Kadota et al. | 73/115.02 |
| 7,013,223 B1 | 3/2006 | Zhang et al. | |
| 7,962,295 B2 | 6/2011 | Vianna | |
| 8,302,720 B2 * | 11/2012 | Rose et al. | 180/167 |
| 8,499,616 B2 | 8/2013 | Stoner et al. | |
| 8,596,404 B1 * | 12/2013 | Stoner et al. | 180/307 |
| 8,646,313 B2 * | 2/2014 | Gale et al. | 73/37 |
| 2004/0001763 A1 * | 1/2004 | Rush | 417/269 |
| 2004/0230384 A1 | 11/2004 | Haynes et al. | |
| 2005/0284149 A1 | 12/2005 | Jansen et al. | |
| 2006/0149519 A1 * | 7/2006 | Keller | 703/8 |
| 2007/0125797 A1 | 6/2007 | Cedrone et al. | |
| 2008/0259728 A1 | 10/2008 | Kyllingstad | |
| 2009/0111637 A1 * | 4/2009 | Day et al. | 475/159 |
| 2010/0228525 A1 | 9/2010 | Arneson et al. | |
| 2010/0320019 A1 * | 12/2010 | Gale et al. | 180/65.27 |
| 2014/0154097 A1 * | 6/2014 | Gale et al. | 417/44.2 |

* cited by examiner

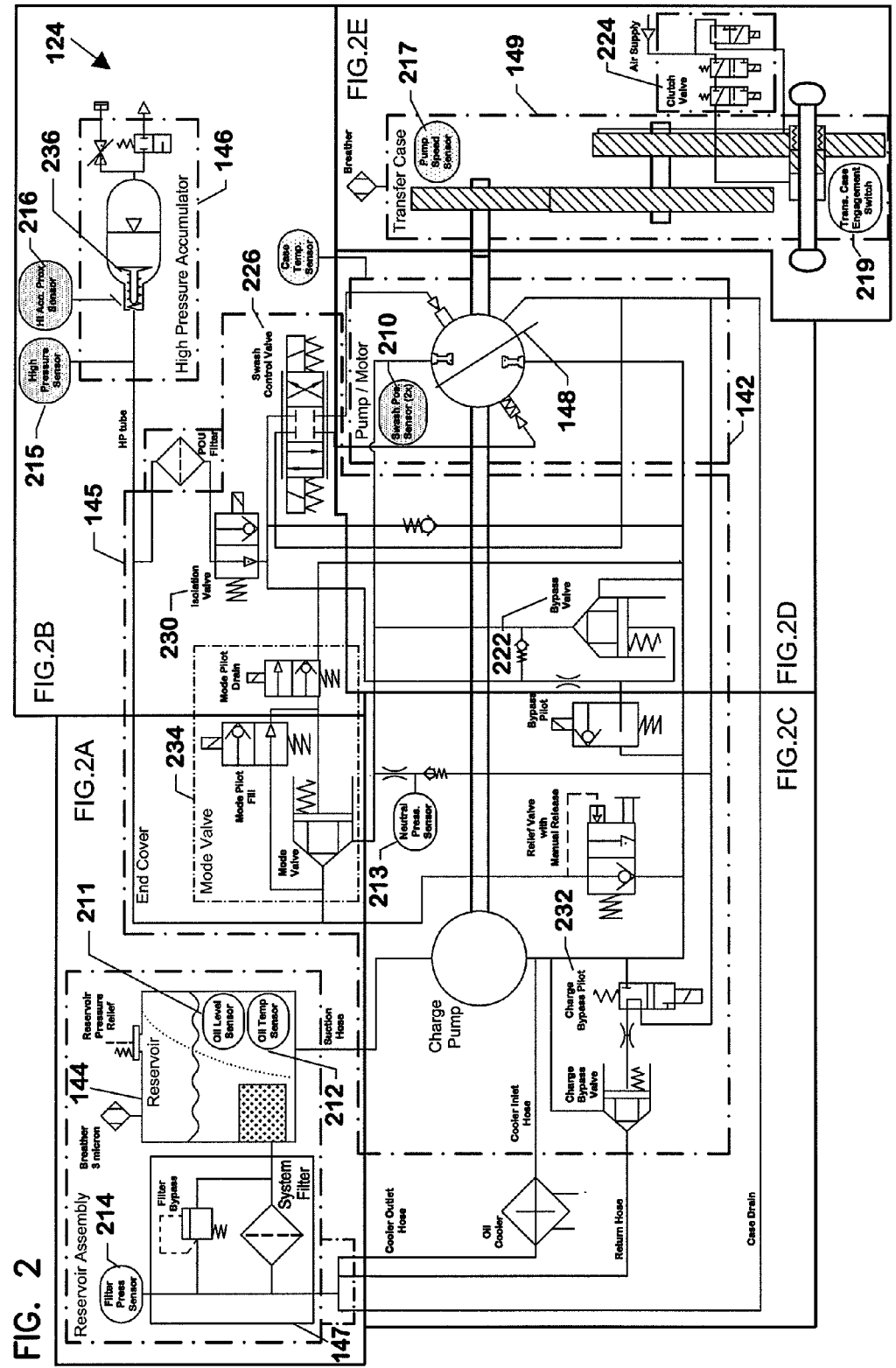

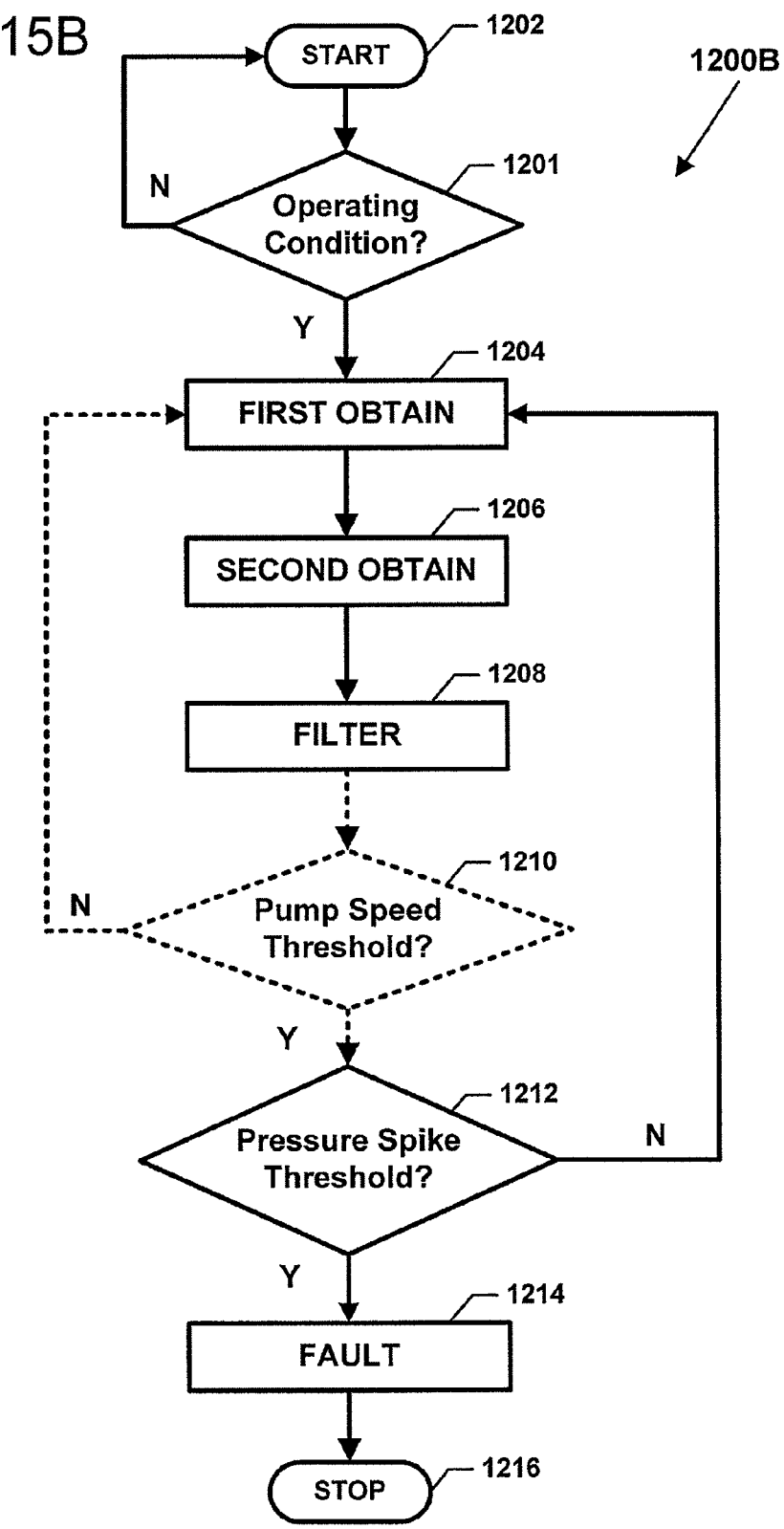

FAULT DETECTION AND MITIGATION IN HYBRID DRIVE SYSTEM

CROSS REFERENCE TO RELATED APPLICATIONS

This application is a divisional application of U.S. patent application Ser. No. 12/814,303, filed 11 Jun. 2010, now issued as U.S. Pat. No. 8,499,616, which claims priority to U.S. Provisional Patent Application Ser. No. 61/186,136, filed on 11 Jun. 2009, and titled "Fault Detection and Mitigation in Hybrid Drive System," the disclosure of which is hereby incorporated herein by reference.

BACKGROUND

On-highway and off-highway hybrid vehicles are vehicles that include multiple power sources. In one example, the hybrid vehicle may use a conventional gas powered engine to propel the vehicle in one mode of operation and an electric motor to propel the vehicle in another mode of operation. In another example, the hybrid vehicle may use a conventional gas powered engine to propel the vehicle in one mode of operation and a fluid motor to propel the vehicle in another mode of operation. As a result of the multiple power sources, hybrid vehicles provide cost efficient operation.

SUMMARY

Aspects of the present disclosure relate to fault detection and response systems and processes, e.g., for use in vehicles.

In accordance with some aspects of the present disclosure, an example detection method for detecting a barrel leak in a pump system includes filtering a data signal received from a filter pressure sensor or case pressure sensor based on a rotation frequency of the pump; and analyzing the filtered signal to determine whether the filtered signal exceeds a predetermined threshold.

In accordance with other aspects of the present disclosure, an example detection method for detecting a gas leak in a pump system includes estimating a gas pressure based on a fluid temperature and a fluid pressure.

In accordance with other aspects of the present disclosure, an example detection method for detecting a fluid (e.g., oil) leak in a pump system includes comparing an estimate fluid level with an estimated fluid level.

In accordance with other aspects of the present disclosure, an example detection method for detecting an oil leak in a pump system includes comparing an estimated level of fluid in a reservoir to an actual level of the fluid in the reservoir.

BRIEF DESCRIPTION OF THE DRAWINGS

FIG. 2 is a schematic representation of the second power source 124 having features that are examples of aspects in accordance with the principles of the present disclosure;

FIG. 15B is a flowchart illustrating an operational flow for another example leak detection process by which a barrel leak, such as a barrel leak in a pump assembly, can be detected in accordance with the principles of the present disclosure;

DETAILED DESCRIPTION

Reference will now be made in detail to the example aspects of the present disclosure that are illustrated in the accompanying drawings. Wherever possible, the same reference numbers will be used throughout the drawings to refer to the same or like structure.

Figure 1:
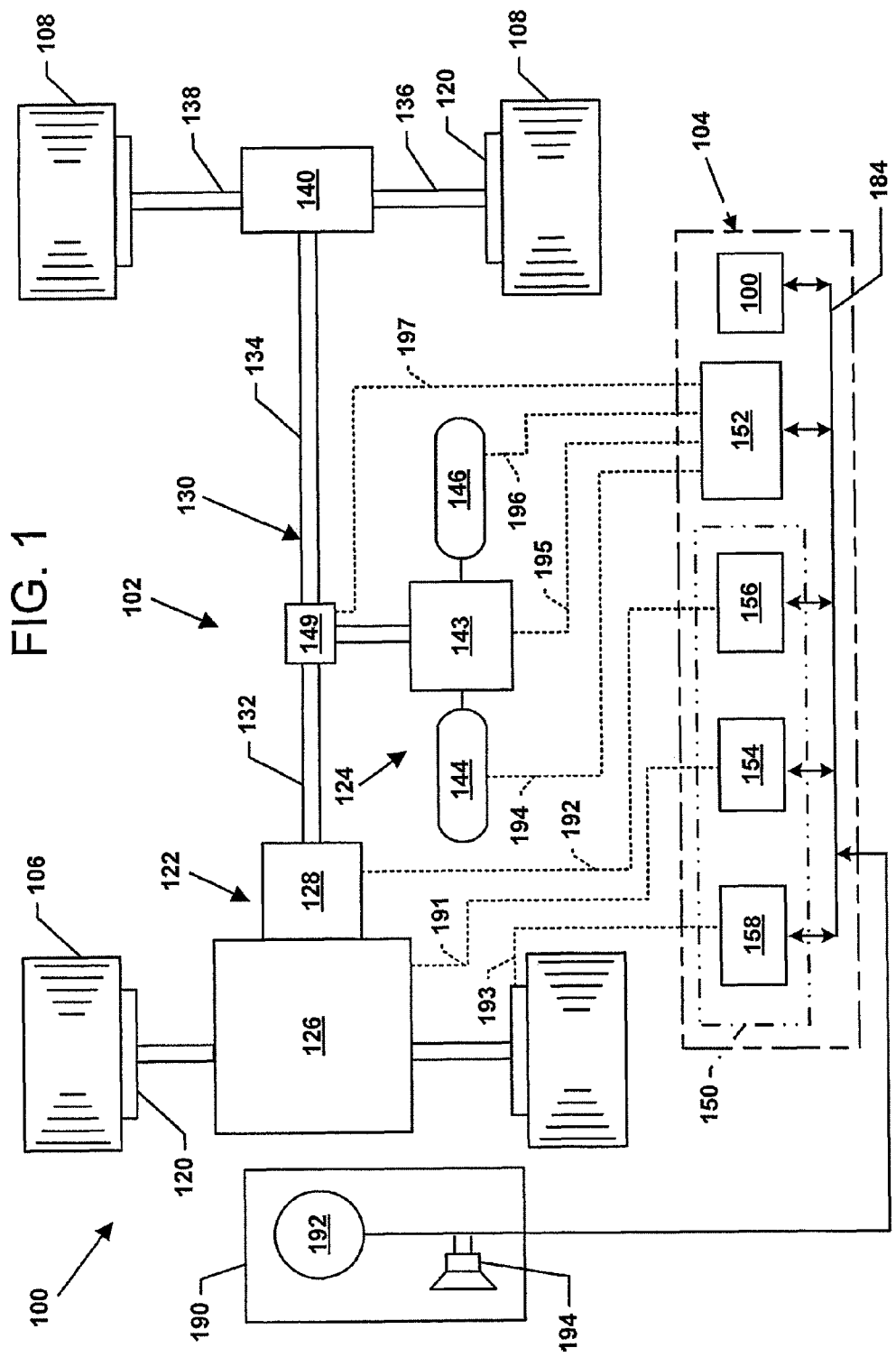
FIG. 1 is a schematic representation of a drive system of a hybrid vehicle having features that are examples of aspects in accordance with the principles of the present disclosure.
Figure 2A:
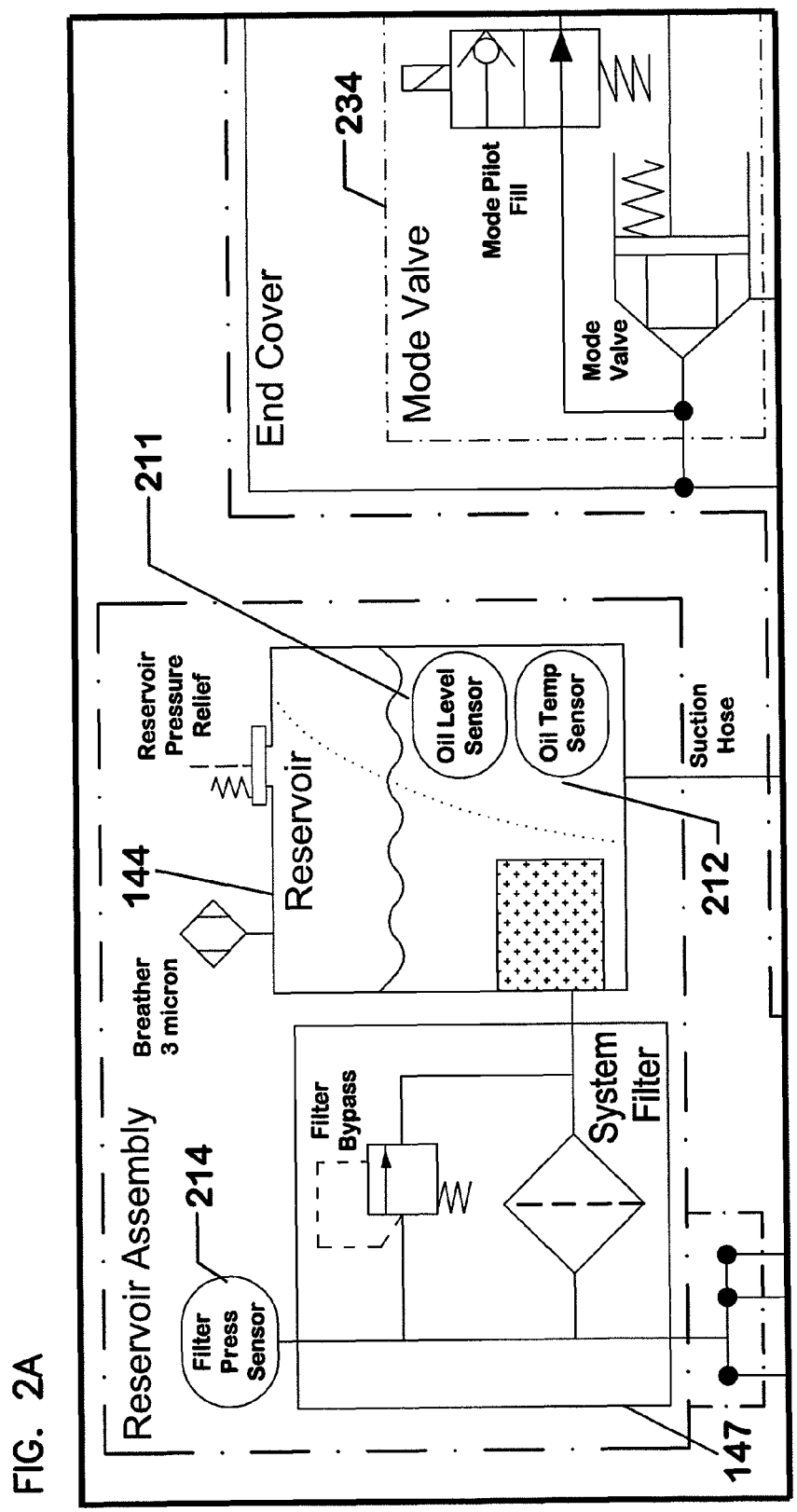
FIGS. 2A-2E show sections of FIG. 2 that are broken out and enlarged for clarity.
Figure 2B:
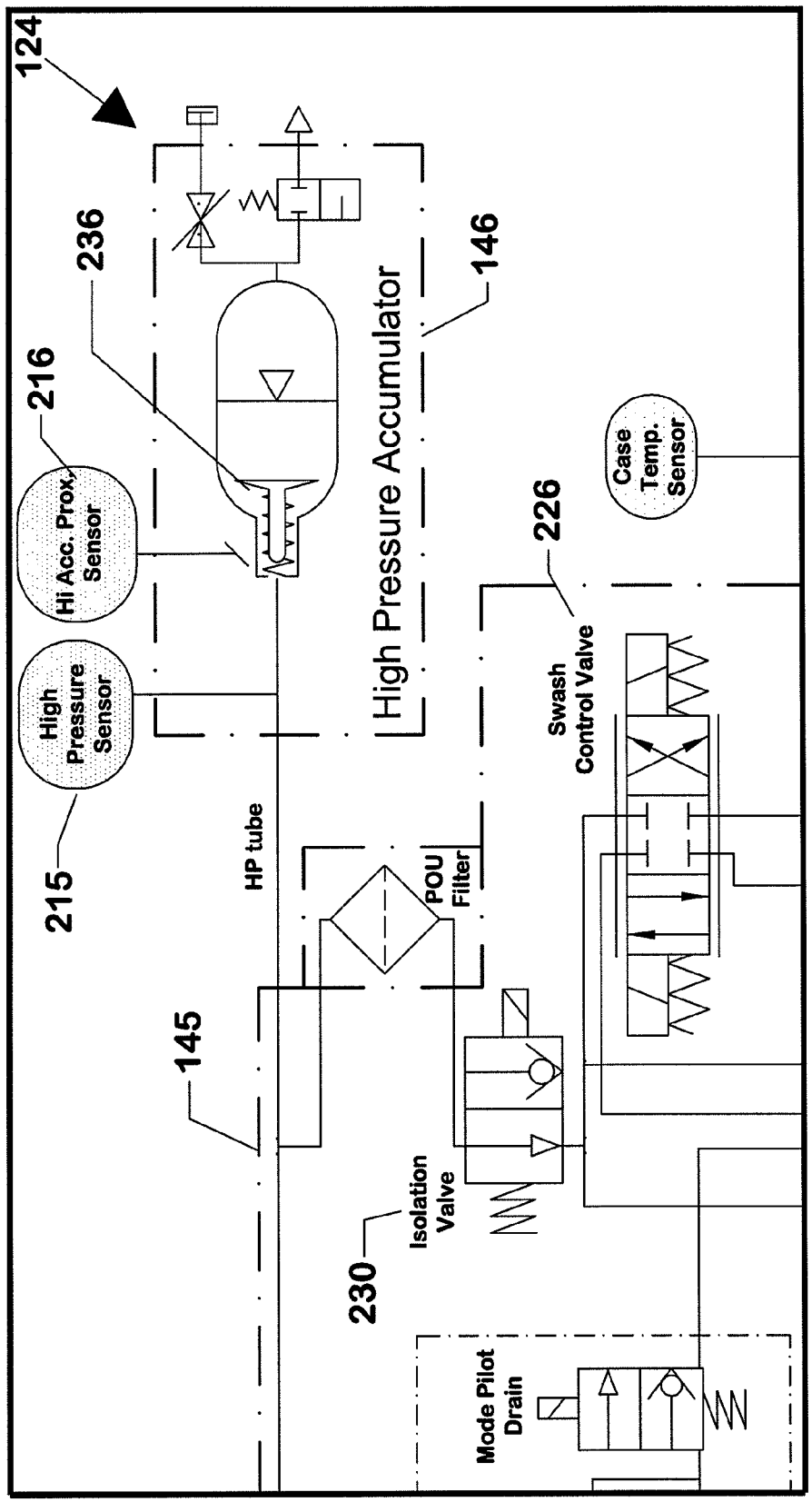
Figure 2C:
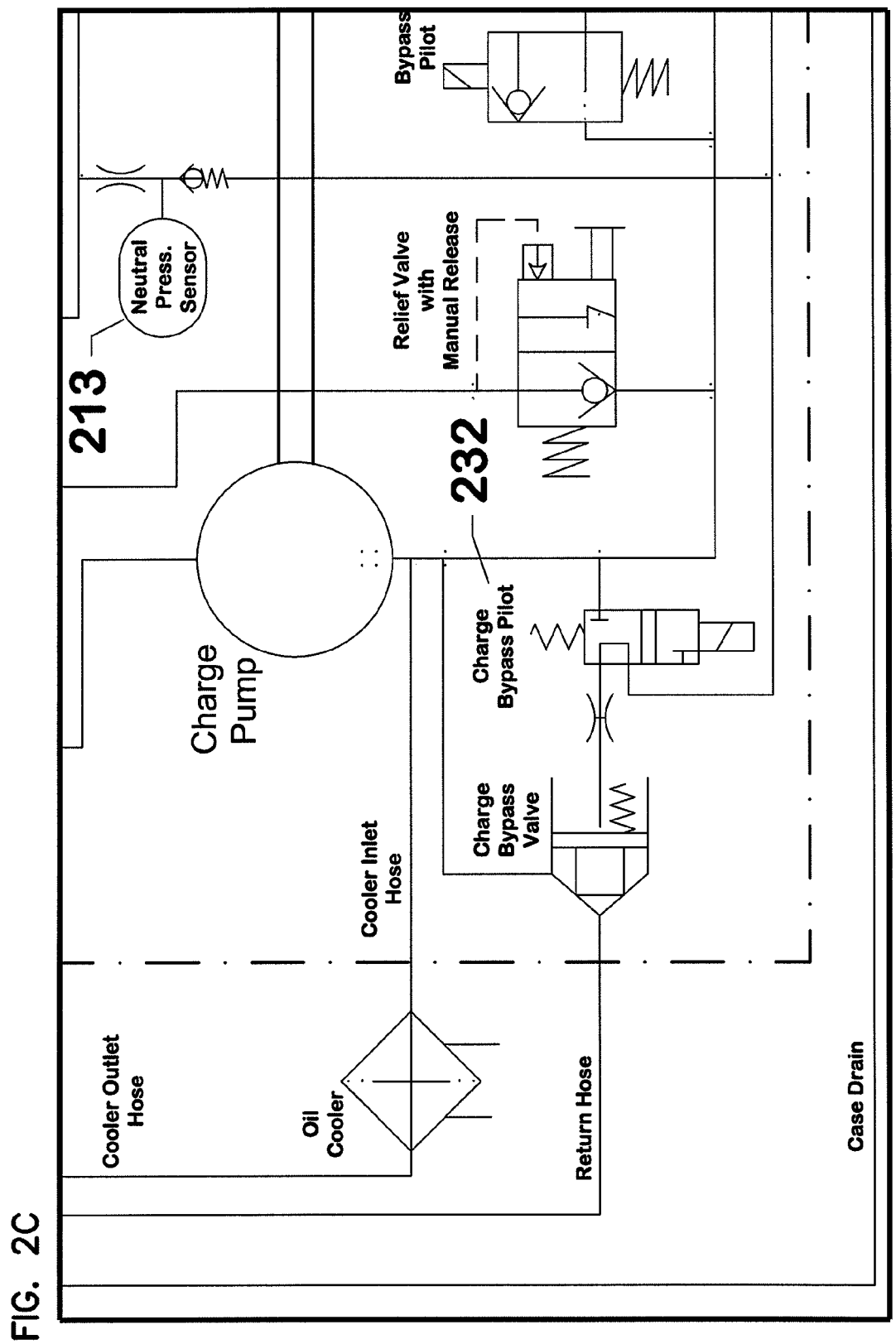
Figure 2D:
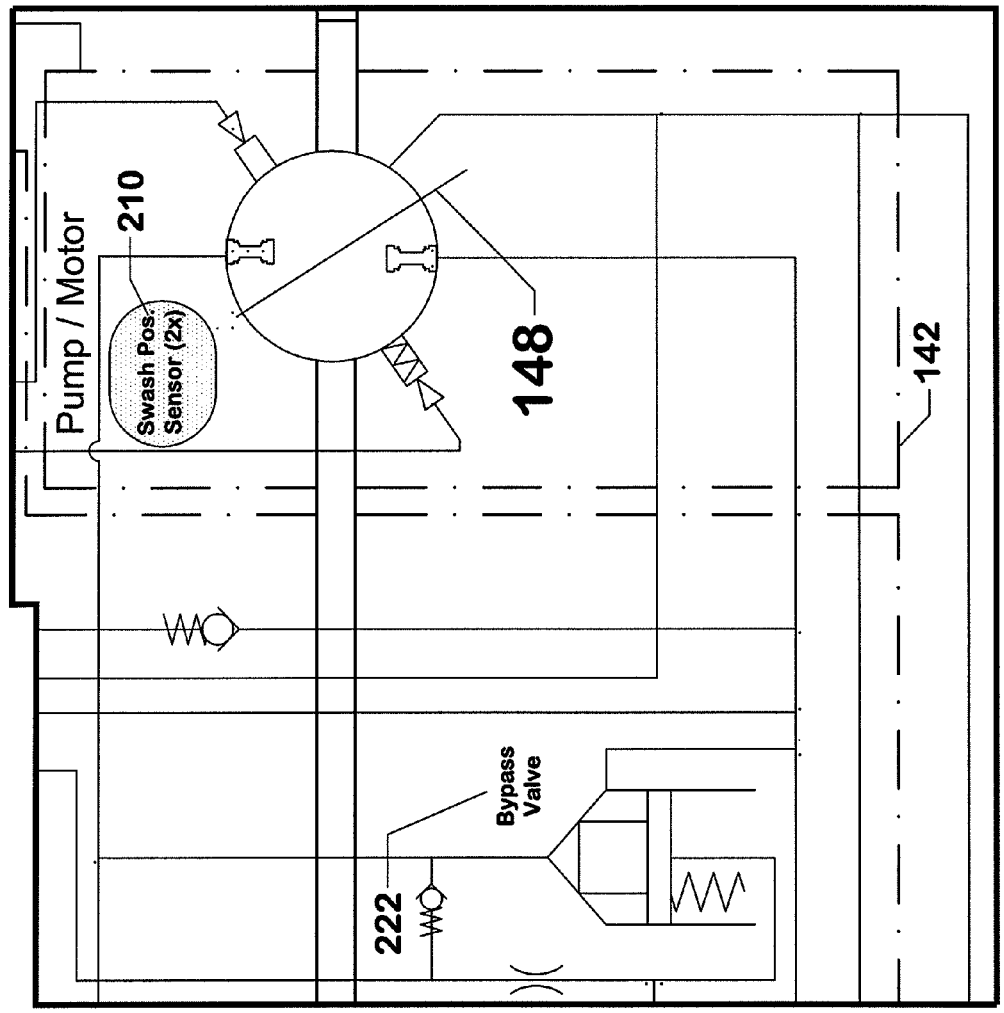
Figure 2E:
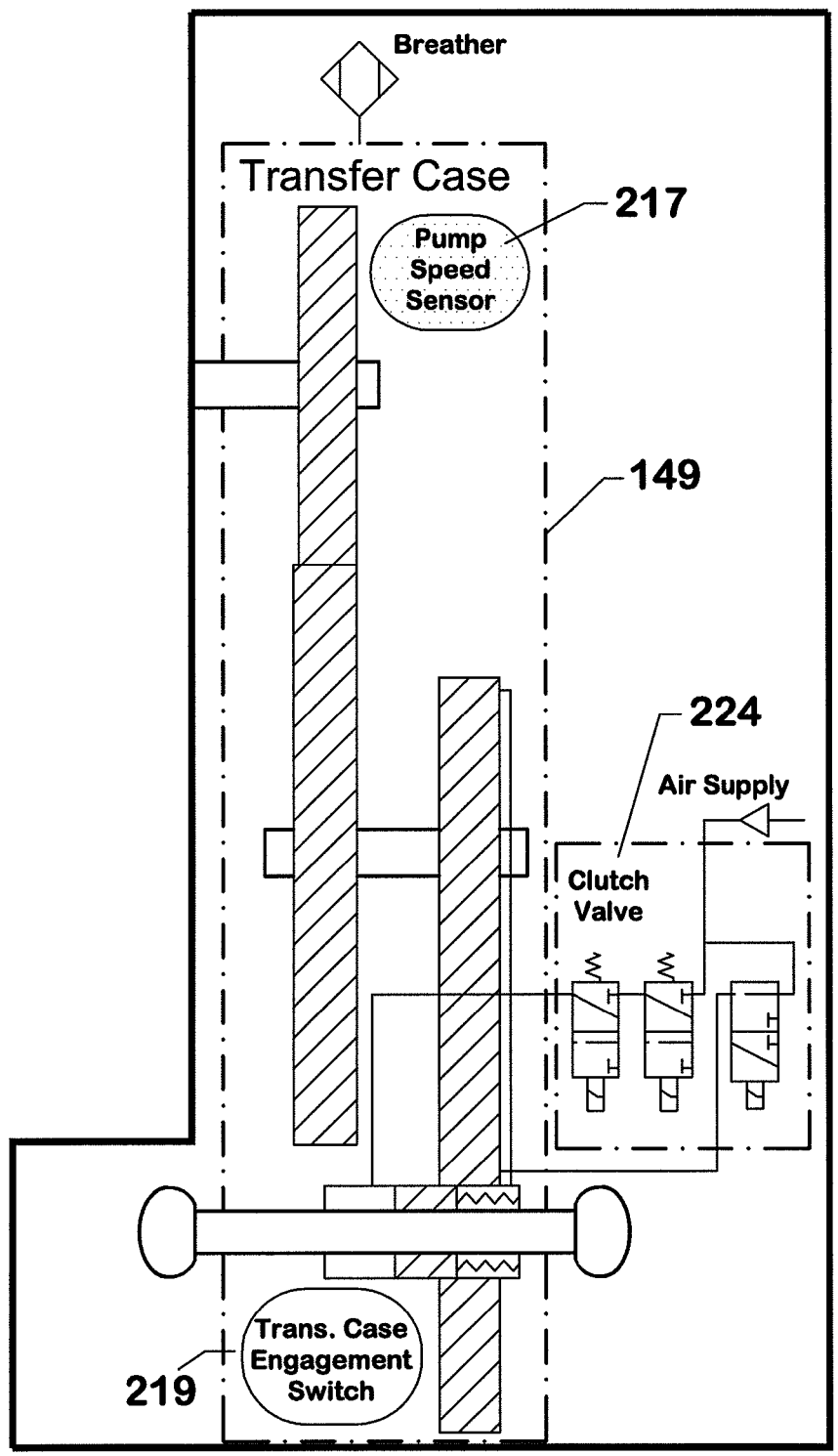

Referring now to FIG. 1, a schematic representation of a drive system, generally designated 100, of a vehicle is shown. In one aspect of the present disclosure, the drive system 100 is suitable for use in an on-highway vehicle, such as a truck, a refuse truck, a bus, or an automobile, or an off-highway vehicle, such as construction and agriculture vehicles.

In the depicted example of FIG. 1, the drive system 100 includes a hybrid drive assembly, generally designated 102, and a control system, generally designated 104. The hybrid drive assembly 102 is adapted to selectively propel the vehicle while the control system 104 is adapted to control the hybrid drive assembly 102.

In one aspect of the present disclosure, the drive system 100 further includes one or more front wheels 106 and one or more rear wheels 108. A brake 120 is operably associated with each of the front and rear wheels 106, 108 of the drive system 100. The brakes 120 are adapted to selectively decrease the kinetic energy of the vehicle. In one aspect of the present disclosure, the brakes 120 are friction brakes. Non-limiting examples of friction brakes that are suitable for use in the drive system 100 include disc brakes, drum brakes, mechanically actuated brakes, hydraulically actuated brakes, pneumatically actuated brakes, electronically actuated brakes, or combinations thereof.

The hybrid drive assembly 102 of the drive system 100 includes a first power source, generally designated 122, and a second power source, generally designated 124. In the depicted example of FIG. 1, the second power source 124 is disposed in parallel to the first power source 122. In other examples, however, the second power source 124 can be disposed in series to the first power source 122.

In some aspects of the present disclosure, the first power source 122 of the hybrid drive assembly 102 includes a conventional prime mover 126, such as an internal combustion engine. Generally, the prime mover 126 generates power in response to combustion of fuel. In one aspect of the present disclosure, the first power source 122 also includes a transmission 128, such as a conventional transmission unit. When the second power source 124 is connected in parallel to the first power source 122, the transmission 128 directs the power from the prime mover 126 to at least one of wheels 106, 108 through a drive line, generally designated 130.

In one aspect of the present disclosure, the drive line 130 includes a front drive shaft 132, a rear drive shaft 134, left and right axle shafts 136, 138 and a differential 140. The differential 140 is disposed between the left and right axle shafts 136, 138. In the example shown, the left and right axle shafts 136, 138 connect the rear wheels 108 to the differential 140. In other aspects, the drive line 130 can include axle shafts that connect the front wheels 106 to a differential.

Referring to FIGS. 1 and 2, in certain aspects of the present disclosure, the second power source 124 is a hydraulic power source. For example, the second power source 124 includes a pump-motor assembly 143, a fluid reservoir 144, and an energy storage unit 146. In accordance with some aspects, the second power source 124 also includes a system filter 147 (FIG. 2). The pump-motor assembly 143 includes a pump/motor unit 142 and an end cover assembly 145 (FIG. 2). The pump-motor assembly 143 is arranged in selective fluid communication with a fluid reservoir 144 and an energy storage unit 146.

According to one aspect, the pump/motor unit 142 is of a variable displacement type. In one aspect of the present disclosure, the pump/motor unit 142 is of the axial piston type (e.g., a variable displacement axial piston type). The pump/motor unit 142 includes a servo actuator that is engaged to a variable swashplate 148. The servo actuator is adapted to selectively adjust the angle of the swashplate 148, which adjusts the displacement of the pump/motor unit 142. In one aspect of the present disclosure, the energy storage unit 146 is an accumulator. In another aspect of the present disclosure, the energy storage unit 146 is a gas-charged accumulator.

Figure 4:
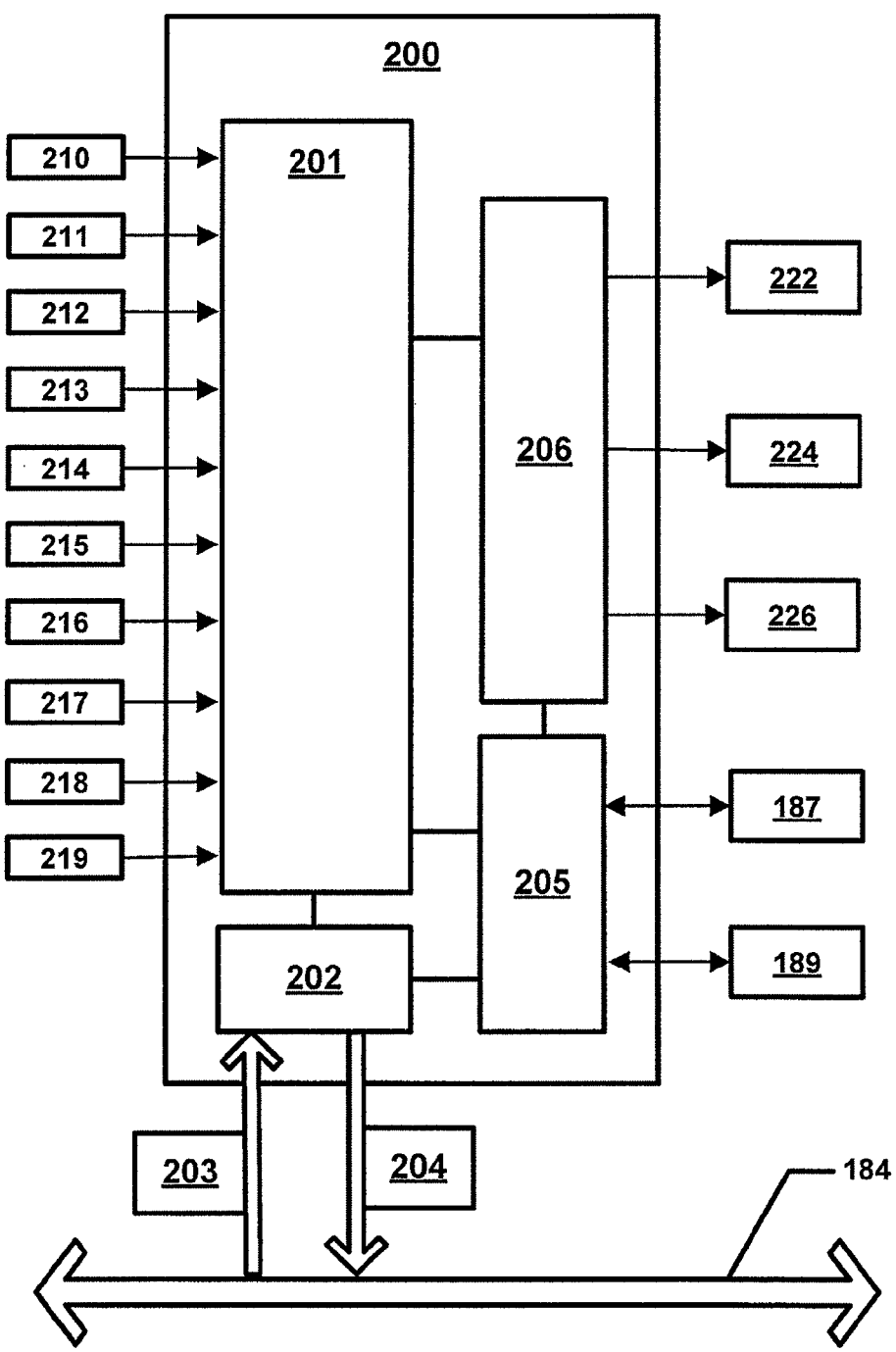
FIG. 4 is a block diagram of an example fault detection system that is configured to implement fault monitoring and response for the second power source control system in accordance with the principles of the present disclosure.

The second power source 124 further includes an engagement assembly 149. In one aspect of the present disclosure, the engagement assembly 149 is disposed between the front and rear drive shafts 132, 134. The engagement assembly 149 is adapted to selectively engage the pump/motor unit 142 to the drive line 130. In one aspect of the present disclosure, the engagement assembly 149 includes a clutch configured to selectively engage the pump/motor unit 142 to the drive line 130. For example, the clutch can include a clutch valve 224 (FIGS. 2 and 4). In another aspect of the present disclosure, the engagement assembly 149 includes a transfer case (see FIG. 2).

In one aspect of the present disclosure, the engagement assembly 149 is adapted to engage (e.g., via the clutch) the pump/motor unit 142 to the drive line 130 when the vehicle decelerates. During deceleration, the pump/motor unit 142 is engaged with the drive line 130 and acts as a pump. The pump/motor unit 142 transfers (e.g., pumps) fluid from the fluid reservoir 144 to the energy storage unit 146. As the fluid is transferred to the energy storage unit 146, the pressure of the fluid in the energy storage unit 146 increases.

In another aspect of the present disclosure, the engagement assembly 149 is adapted to engage (e.g., via the clutch) the pump/motor unit 142 to the drive line 130 when the vehicle accelerates. During acceleration, the pump/motor unit 142 is engaged with the drive line 130 and acts as a motor. The pump/motor unit 142 receives pressurized fluid from the energy storage unit 146, which results in the pump/motor unit 142 transmitting torque to the drive line 130. This torque generated from the pump/motor unit 142 and transmitted to the drive line 130 is used to propel the vehicle.

In other aspects, the second power source 144 is connected in series with the first power source 142 and the prime mover 126 is coupled to the pump/motor unit 142. The pump/motor unit 142 is in fluid communication with a motor assembly (not shown) that is coupled to the left and right axle shafts 136, 138.

Referring still to FIG. 1, one example control system 104 will be described. In one aspect of the present disclosure, the example control system 104 includes a first power source control system, generally designated 150, and a second power source control system, generally designated 152.

The first power source control system 150 is adapted to control the first power source 122. In one aspect of the present disclosure, the first power source control system 150 includes a prime mover control unit 154, a transmission control unit 156 and a brake control unit 158. While the prime mover control unit 154 and the transmission control unit 156 can be combined into a singe powertrain control module, the prime mover control unit 154 and the transmission control unit 156 will be described herein as being separate units.

The prime mover control unit 154 is adapted to control the operational aspects of the prime mover 126 as will be described in greater detail herein. The prime mover control unit 154 is operationally coupled (see dotted line 191 in FIG. 1) to the prime mover 126. For example, when used with an internal combustion type engine, the prime mover control unit 154 can be adapted to control, e.g., one or more of the following: amount of fuel injected into the engine, the idle speed of the engine, ignition timing, and/or engine valve timing.

The transmission control unit 156 is adapted to control the operational aspects of the transmission 128 as will be described in greater detail herein. The transmission control unit 156 is operationally coupled (see dotted line 192 in FIG. 1) to the transmission 128. For example, the transmission control unit 156 can be used to calculate how and when to change gears in the vehicle in order to optimize fuel efficiency and/or vehicle performance.

The brake control unit 158 is adapted to control the operational aspects of the brakes 120. The brake control unit 158 is operationally coupled (see dotted line 193 in FIG. 1) to the brakes 120. For example, the brake control unit 158 can be adapted to provide anti-lock braking during various driving conditions and/or to provide a uniform relationship between pedal effort and brake effectiveness.

The second power source control system 152 is adapted to control the operational aspects of the second power source 124. In one aspect of the present disclosure, the second power source control system 152 also is adapted to selectively control an operational aspect of the prime mover 126 of the first power source 122. For example, the second power source control system 152 can be adapted to limit the torque output of the prime mover 126 when the second power source 124 is actively engaged to the drive line 130.

In one aspect of the present disclosure, the prime mover control unit 154, the transmission control unit 156, the brake control unit 158 and the second power source control system 152 communicate with vehicle components, associated sensors, and each other via a communication network 184 (shown in FIG. 1 as a solid line). In one aspect of the present disclosure, the communication network 184 is a controller-area network (CAN or CAN-Bus). In another aspect of the present disclosure, the communication network 184 having network protocol (e.g., J1939, HDOBD, OBD-II, EOBD, JOBD).

In the example shown, the vehicle also includes a user interface 190 that is configured to display information to the user. For example, the user interface 190 can include gauges, indicator lights, electronic readouts (e.g., textual, numerical, etc.), sounds, etc. In one aspect of the present disclosure, the user interface 190 is communicatively coupled to the communication network 184. In another aspect, the user interface 190 can be communicatively coupled directly to the second power source control unit 152.

Figure 3:
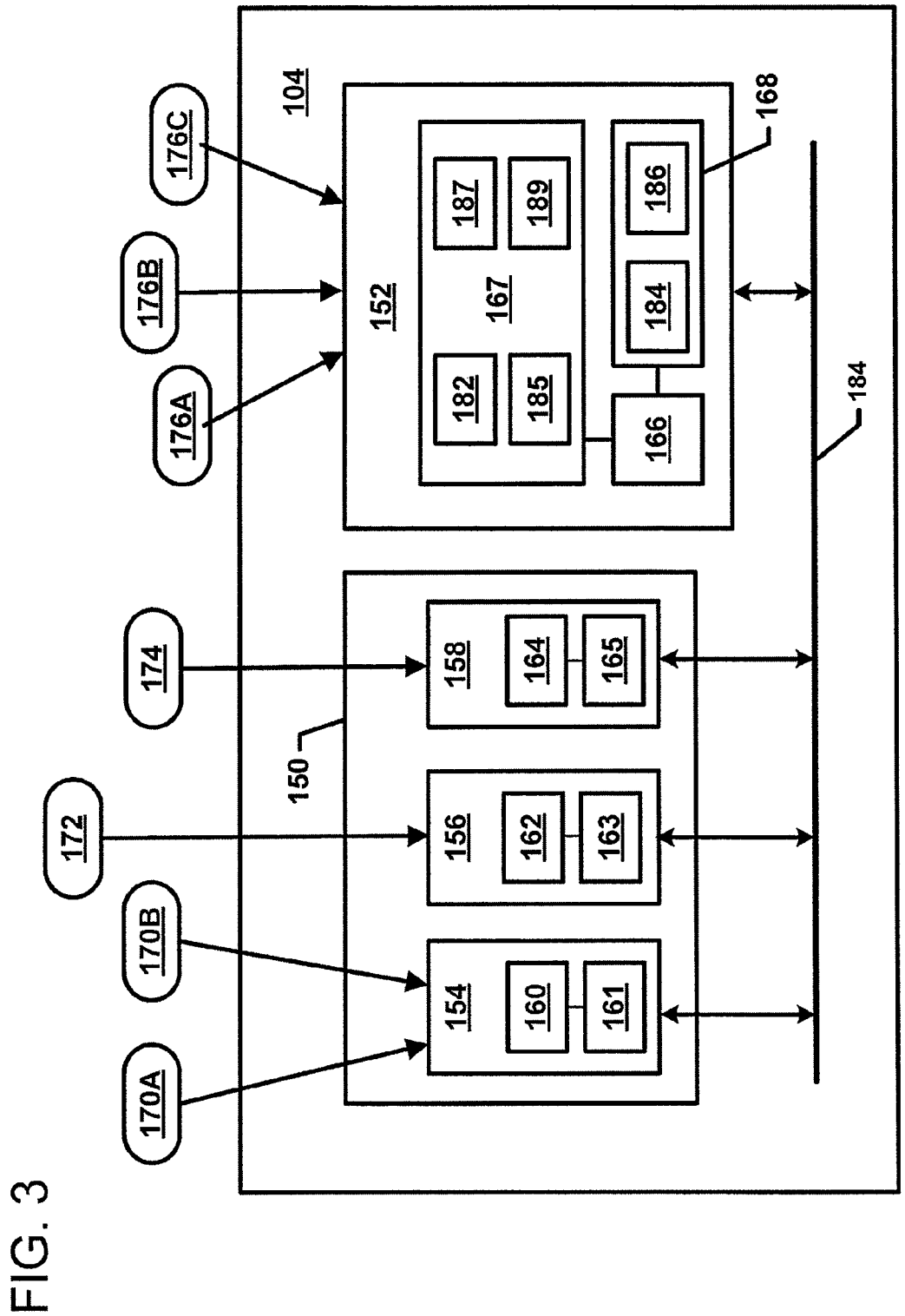
FIG. 3 is a block diagram of one example control system for a hybrid drive assembly having features that are examples of aspects in accordance with the principles of the present disclosure.

FIG. 3 is a block diagram of one example control system 104 for a drive assembly, such as drive assembly 102 of FIGS. 1 and 2. The control assembly 104 of FIG. 3 includes a first power source control unit 150 and a second power source control unit 152 communicatively coupled together via a communications network 184. According to one aspect, the communications network 184 can be electrically connected. According to other aspects, however, the communications network 184 can be wirelessly connected.

In one aspect of the present disclosure, a prime mover control unit 154 of the first power source control unit 150 includes a processor (e.g., a microprocessor) 160 and a non-volatile memory component 161. The processor 160 of the prime mover control unit 154 is adapted to receive electronic data signals from one or more prime mover sensors 170. For example, two prime mover sensors 170A, 170B are shown in FIG. 3. In accordance with one aspect, the sensors 170A, 170B are positioned adjacent the prime mover 126. In accordance with other aspects, however, any number of sensors 170 can be operationally coupled to the processor 160 of the prime mover control unit 154.

In one aspect of the present disclosure, the processor 160 can receive the electronic data signals from the sensors 170 via the communications network 184. In another aspect of the present disclosure, the processor 160 can receive the electronic data signals through a direct communications link (e.g., hardwire) with the sensor(s) 170A, 170B. Non-limiting examples of prime mover sensors 170 can include any one or more of the following: a throttle position sensor, an oxygen sensor, an RPM sensor, a mass airflow sensor, a manifold absolute pressure (MAP) sensor, a coolant sensor, a knock sensor, a crankshaft position sensor, and/or an oil temperature sensor.

The microprocessor 160 of the prime mover control unit 154 is adapted to calculate control parameters for the prime mover 126 from algorithms stored on the non-volatile memory component 161. The control parameters are calculated using the electronic data signals received from the one or more prime mover sensors 170 and are used to control the operation of the prime mover 126 (e.g., via control connection 191 of FIG. 1).

The non-volatile memory component 161 stores software, firmware, etc. that is used by the processor 160 to control the prime mover 126 and to make the control parameter calculations. The non-volatile memory component 161 is capable of storing the software, firmware, etc. when the prime mover control unit 154 is not powered. An example non-volatile memory component suitable for use with the prime mover control unit 154 includes, but is not limited to, Erasable Programmable Read-Only Memory (EPROM), Electrically Erasable Programmable Read-Only Memory (EEPROM), flash memory, etc.

In one aspect of the present disclosure, the transmission control unit 156 includes a processor (e.g., a microprocessor) 162 and a non-volatile memory component 163 (e.g., EPROM, EEPROM, flash memory, etc.). The processor 162 of the transmission control unit 156 is adapted to receive electronic data signal inputs from one or more transmission sensors 172. In the example shown in FIG. 3, only one transmission sensor 172 is operationally coupled to the processor 162 of the transmission control unit 156. In accordance with other aspects, however, any number of sensors 172 can be operationally coupled to the processor 162 of the transmission control unit 156.

In one aspect of the present disclosure, the processor 162 can receive the electronic data signals via the communications network 184. In another aspect of the present disclosure, the processor 162 can receive the electronic data signals through a direct communications link (e.g., hardwire) with the sensor(s) 172. Non-limiting examples of transmission sensors 172 can include any one or more of the following: an input speed sensor, an output speed sensor, a wheel speed sensor, a throttle position sensor, and/or a transmission fluid temperature sensor. In another aspect of the present disclosure, the transmission control unit 156 can be adapted to receive electronic data signal inputs from any one or more of a kick down switch, which is used to determine if the accelerator has been depressed past full throttle, a traction control system, a cruise control module, etc.

The processor 162 of the transmission control unit 156 is adapted to calculate control parameters for the transmission 128 from algorithms stored on the non-volatile memory component 163. The control parameters are calculated using the electronic data signals received from the one or more transmission sensors 172 and are used to control the operation of the transmission 128.

In one aspect of the present disclosure, the brake control unit 158 includes a processor (e.g., a microprocessor) 164 and a non-volatile memory component 165 (e.g., EPROM, EEPROM, flash memory, etc.). The processor 164 of the brake control unit 158 is adapted to receive electronic data signal inputs from one or more brake sensors 174. The processor 164 of the brake control unit 158 is adapted to calculate control parameters for the brakes 120 from algorithms stored on the non-volatile memory component 165. The control parameters are calculated using the electronic data signals received from the one or more brake sensors 174 and are used to control the operation of the brakes 120.

In one aspect of the present disclosure, the processor 164 can receive the electronic data signals via the communications network 184. In another aspect of the present disclosure, the processor 164 can receive the electronic data signals through a direct communications link (e.g., hardwire) with the sensor(s) 174. Non-limiting examples of the brake sensor(s) 174 can include any one or more of the following: wheel speed sensors, a pressure sensor for monitoring pressure of brake fluid, and/or a pedal position sensor.

In one aspect of the present disclosure, the second power source control system 152 includes a processor (e.g., a microprocessor) 166, a non-volatile memory component 167 (e.g., EPROM, EEPROM, flash memory, etc.), and a volatile memory component 168. The processor 166 is adapted to receive electronic data signal inputs from one or more sensors 176. In one aspect of the present disclosure, non-limiting examples of the one or more sensors 176 can include any one or more of the following: an accumulator pressure sensor; a filter pressure sensor, a neutral pressure sensor; a pump/motor speed sensor; a reservoir fluid temperature sensor; a pump case temperature sensor; a reservoir fluid level sensor; a swashplate angle sensor; a brake pressure sensor; and/or an accumulator and transfer case proximity sensor. In the example shown, the processor 166 is operationally coupled to three data sensors 176A, 176B, and 176C. In accordance with aspects, however, the processor 166 can be operationally coupled to greater or fewer sensors 176.

The processor 166 of the second power source control system 152 is adapted to calculate control parameters for the second power source 124 from control algorithms 185 stored on the non-volatile memory component 167 of the second power source control system 152. The control parameters are calculated using the electronic data signals received from the one or more sensors 176. The non-volatile memory 167 also is configured to store fault detection algorithms 187 and operating parameters 189 for the second power source control system 152 (FIG. 4). For example, the memory 167 can store algorithms according to which fault conditions are triggered, upper and lower limits used in these algorithms, and error messages indicating the failure or malfunction of one or more system components.

Fault conditions detected by the processor 166 can be stored in either the non-volatile memory 167 or the volatile memory 168. According to some aspects, fault conditions can be divided into three types: non-latching, latching, and disabling. In accordance with aspects, latching and non-latching fault conditions are stored in volatile memory 168 and disabling fault conditions are stored in non-volatile memory 167. Accordingly, latching and non-latching fault conditions are erased from the memory 168 when the vehicle is keyed off. Disabling fault conditions remain in memory 167 even after a key off/on event.

FIG. 4 is a block diagram of an example fault detection system 200 configured to implement fault monitoring and response for the second power source control system 152. According to one aspect, the example fault detection system 200 is implemented using the processor 166 and the memory 167 of the second power source control system 152. According to another aspect, the example fault detection system 200 can be implemented using processors and/or memory of other systems.

For example, fault conditions can be stored in a data logger system in place of or in addition to storage in the memory 167 of the second power source control system 152. One example data logger system is shown in FIG. 1 and designated as reference no. 100. The data logger 100 shown is operationally coupled to the communications network 184. Additional information about a suitable data logger can be found in U.S. Application Ser. No. 61/158,542, filed Mar. 9, 2009, titled DATA LOGGER FOR HYBRID VEHICLE, the disclosure of which is hereby incorporated herein by reference.

The example fault detection system 200 includes one or more monitoring modules 201 configured to receive electronic data signals from one or more sensors, which will be described in detail herein. In the example shown, the example fault detection system 200 includes one monitoring module 201 that receives sensor input. In other example systems, multiple monitoring modules can receive and process the sensor input. For example, each sensor may have a corresponding monitoring module.

The monitoring module 201 is configured to analyze the received data signals to determine whether a fault condition has occurred. The example fault detection system 200 includes one or more response modules 206 configured to react to a detected fault condition. The fault detection system 200 also includes a communications network interface 202, which is configured to send and receive messages to and from the communications network 184 of the vehicle, and a memory interface 205, which is configured to interact with the memory 167 of the second power source control system 152 and/or other memory storage units (e.g., a data logger) within the vehicle.

According to one aspect, the monitoring module(s) 201 receives data signals from one or more sensors. Non-limiting examples of suitable data sensors include one or more swash plate position sensors 210 that indicates the position of the swash plate in the pump/motor 142, a fluid (e.g., oil) level sensor 211 that indicates the amount of fluid in the fluid reservoir 144, a fluid temperature sensor 212 that indicates a temperature of the fluid in the reservoir 144, a neutral pressure sensor 213 indicating pressure in the end cover assembly 145, a filter pressure sensor 214 indicating the state of the system filter 147, a high pressure sensor 215 indicating pressure in the energy storage unit 146, an accumulator proximity sensor 216 that indicates whether a foot valve 236 is open or closed, a pump speed sensor 217 that indicates the number of revolutions per minute at which the pump/motor unit 142 is spinning, a case temperature sensor 218 indicating a temperature in the pump housing of the pump/motor 142, and a transfer case switch sensor 219 that indicates whether or not the second power source 124 is selectively engaged with the drive line 130. In accordance with other aspects, however, the monitoring module 201 also can receive data signals from other types of sensors, e.g., a brake pressure sensor (not shown) indicating pressure in the brakes 120 of the vehicle.

According to aspects, the monitoring module(s) 201 also can receive input messages 203 from the communications network (e.g., the CAN bus) 184 of the vehicle through the network interface 202. According to one aspect, the input messages 203 indicate the operating status of components outside the second power source 124. Non-limiting examples of input messages 203 can include the engine speed, the wheel-based vehicle speed, the input shaft speed, the output shaft speed, the actual gear ratio of the engine, the current gear in which the engine is configured, the accelerator pedal position, the percent torque of driver demand on the engine, the percent torque of nominal friction, and/or an indication of whether or not the anti-lock brake system (ABS) or cruise control is active.

According to one aspect, the network interface 202 also transmits output messages 204 to the communications network 184. Non-limiting examples of output messages 204 can include a torque limit, a speed limit indicating a maximum speed at which the vehicle is to be allowed to travel, a status message indicating a status of the second power source 124, codes for the user indicator 190 that specify the occurrence of one or more fault conditions, an override control modes message, and logger data (i.e., data to be stored in data logger 100 of FIG. 1).

According to aspects, the memory interface 205 is configured to obtain data from and transmit data to memory, such as memory 167 of FIG. 3. For example, the memory interface 205 can obtain one or more fault detection algorithms 187 and/or fault detection parameters 189 from memory. Non-limiting examples of data that can be written to the memory by the memory interface 205 can include received sensor data, values of parameters used in the control algorithsm, system component statuses, and fault condition statuses. According to other aspects, the memory interface 205 can write data to additional memory (not shown) via the communications network 184.

According to some aspects, the response module(s) 206 transmits control signals to one or more control valves to operate components of the second power source 124 in response to one or more fault conditions. In the example shown, the response module 206 transmits control signals to a bypass valve 222, a clutch valve 224, and a swash control valve 226. In accordance with other aspects, however, the response module 206 can transmit control signals to any desired valve. For example, the response module 206 can operate an isolation valve 230, a charge bypass valve 232, and a mode valve 234 (see FIG. 2).

In accordance with one aspect, the control signals include electrical signals that are sent to one or more solenoids that are operationally coupled to the valves. For example, the swash control valve 226 can be operated by a motor solenoid and a pump solenoid (see FIG. 2). The bypass valve 222 can be operated by a bypass solenoid and the clutch valve 224 can be operated by a clutch solenoid. In accordance with other aspects, however, the valves can be operated using greater or fewer numbers of solenoids or via other means known to those skilled in the art.

Figure 5:
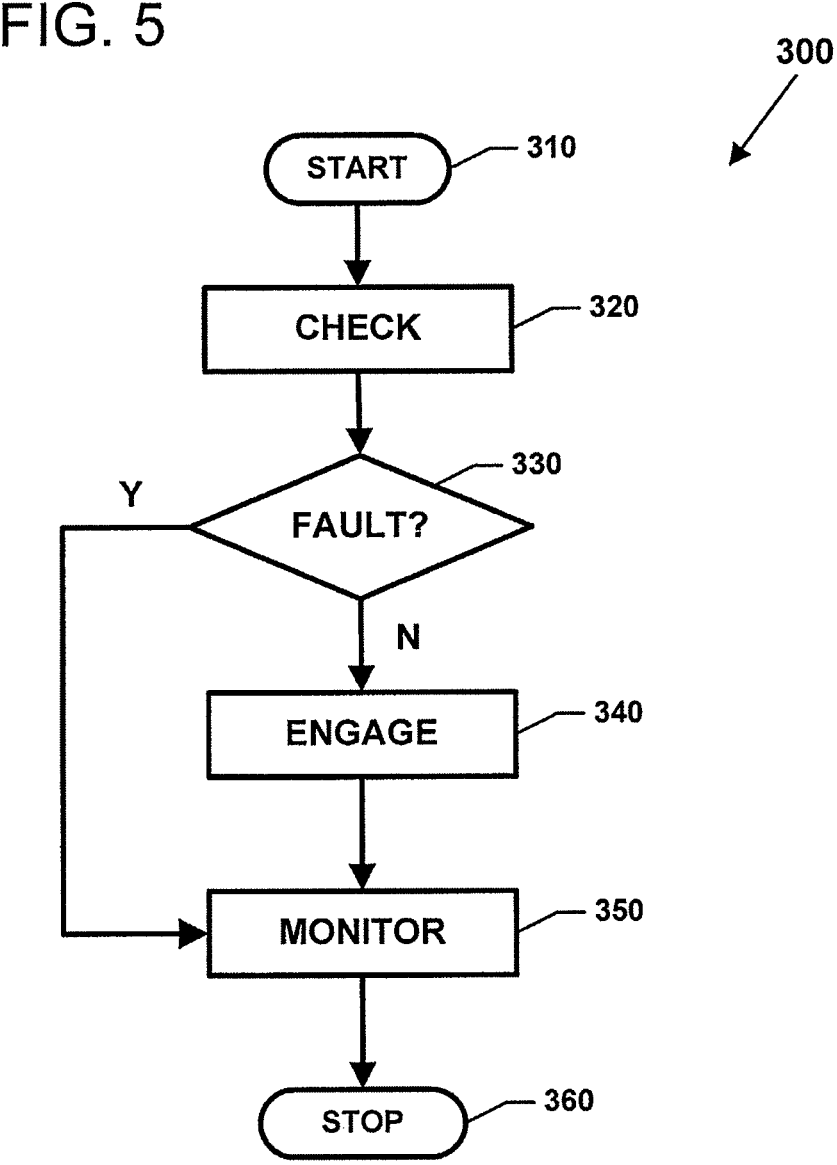
FIG. 5 is a flowchart illustrating an example reset process by which the second power source can be operationally coupled to the drive line of the vehicle in accordance with the principles of the present disclosure.

FIG. 5 is a flowchart illustrating an example reset process 300 by which the second power source 124 can be operationally coupled to the drive line 130 of the vehicle. In accordance with some aspects, the reset process 300 is implemented by the control system 152 each time the vehicle is started (i.e., keyed on). In accordance with other aspects, the reset process 300 also can be implemented when called by other processes as will be described in greater detail herein.

The recess process 300 performs any appropriate initialization procedures, begins at a start module 310, and proceeds to a check operation 320. The check operation 320 accesses the memory of the second power source control system 152 to determine whether any fault conditions are stored. In accordance with one aspect, the check operation 320 accesses the non-volatile memory 167 to check for disabling fault conditions 182. In accordance with another aspect, the check operation 320 accesses the volatile memory 168 to check for non-latching fault conditions 182 and/or latching fault conditions 184.

A determination module 330 determines whether any fault conditions were found in memory. If the determination module 330 determines that no fault conditions are stored in memory, then an engage operation 340 operationally couples the second power source 124 to the vehicle. Regardless of whether or not the engage operation 340 is triggered, a monitor operation 350 repeatedly analyzes sensor readings to determine whether the second power source 124 should be disengaged as discussed in greater detail herein. The reset process 300 performs any appropriate completion procedures and ends at a stop module 360.

Figure 6:
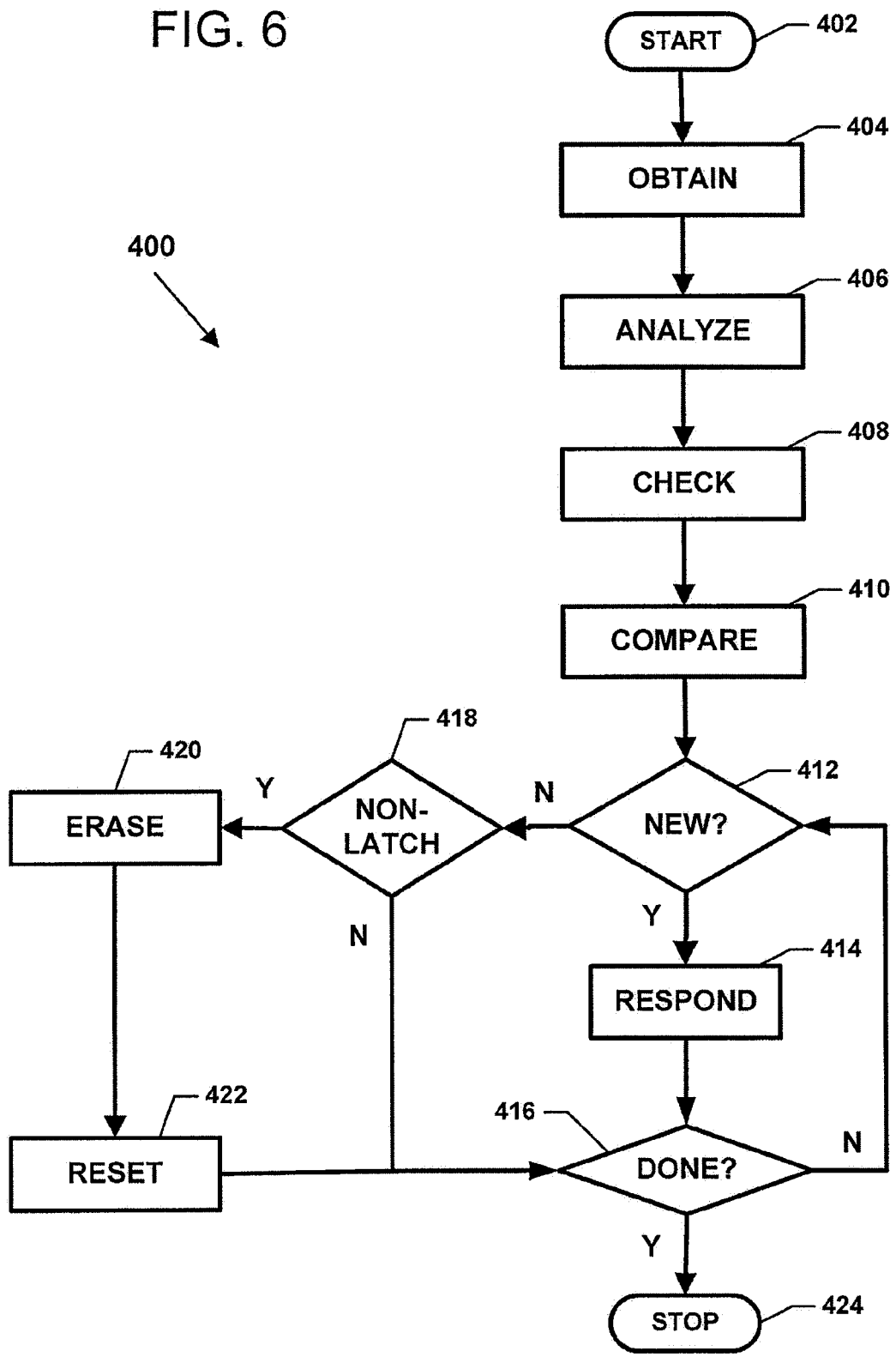
FIG. 6 is a flowchart illustrating an example fault detection process by which system and component failures and/or malfunctions can be detected and reconciled in accordance with the principles of the present disclosure.

FIG. 6 is a flowchart illustrating an example fault detection process 400 by which system and component failures and/or malfunctions can be detected and reconciled. According to one aspect, the example fault detection process 400 is suitable for implementation by the second power source control system 152. The fault detection process 400 performs any appropriate initialization procedures, begins at a start module 402, and proceeds to an obtain operation 404.

The obtain operation 404 receives or pulls electronic data signals. According to one aspect, the obtain operation 404 obtains the electronic data signals from one or more sensors (e.g., sensors 210-219 of FIG. 4). According to another aspect, the obtain operation 404 obtains the electronic data signals from the communications network 184. In one aspect, the obtain operation 404 receives the electronic data signal at the monitoring module 201 of FIG. 4.

An analyze operation 406 processes the received electronic data signal to determine whether a fault condition is triggered. According to some aspects, the analyze operation 406 processes the received electronic data signals based on the fault detection algorithms 187 and parameters 189 stored in the non-volatile memory 167 of the second power source control system 152 (see FIG. 3).

A check operation 408 accesses the memory of the e second power source control system 152 to determine if any fault conditions are stored. For example, the check operation 408 can access the non-volatile memory 167 and/or the volatile memory 168.

A compare operation 410 determines the overlap between the fault conditions detected from the sensor data and the fault conditions stored in memory. Non-overlapping fault conditions indicate either the emergence of new fault conditions (i.e., those fault conditions determined by sensor data and not stored in memory) or the cessation of previous fault conditions (i.e., those fault conditions stored in memory, but not determined by sensor data).

A first determination module 412 determines whether the non-overlapping fault condition is a newly emerged fault condition. If the first determination module 412 determines that a new fault condition is detected, then a respond operation 414 operationally decouples the second power source 124 from the vehicle. One example response process in accordance with one aspect is discussed herein with respect to FIG. 7.

If a second determination module 416 determines that there are additional non-overlapping fault conditions to be addressed, then the fault detection process 400 cycles back to the first determination module 412 and continues as disclosed above. If the second determination module 416 determines that all non-overlapping fault conditions provided by the compare operation 410 have been addressed, then the fault detection process 400 performs any appropriate processes and ends at a stop module 424.

If the first determination module 412 determines that a previously detected fault condition has ceased, however, then a third determination module 418 determines what type of fault condition has ceased. For example, the third determination module 418 can determine whether a non-latching fault, a latching fault, or a disabling fault has been detected. If the third determination module 418 determines that a latching fault condition or a disabling fault condition has been detected, then the fault detection process 400 cycles to the second determination module 416.

If the third determination module 418 determines that a non-latching fault condition has been detected, however, then an erase operation 420 deletes the non-latching fault condition from memory, a reset operation 422 implements the reset process 300 of FIG. 5, and the fault detection process 400 cycles to the second determination module 416 and continues as disclosed above.

Figure 7:
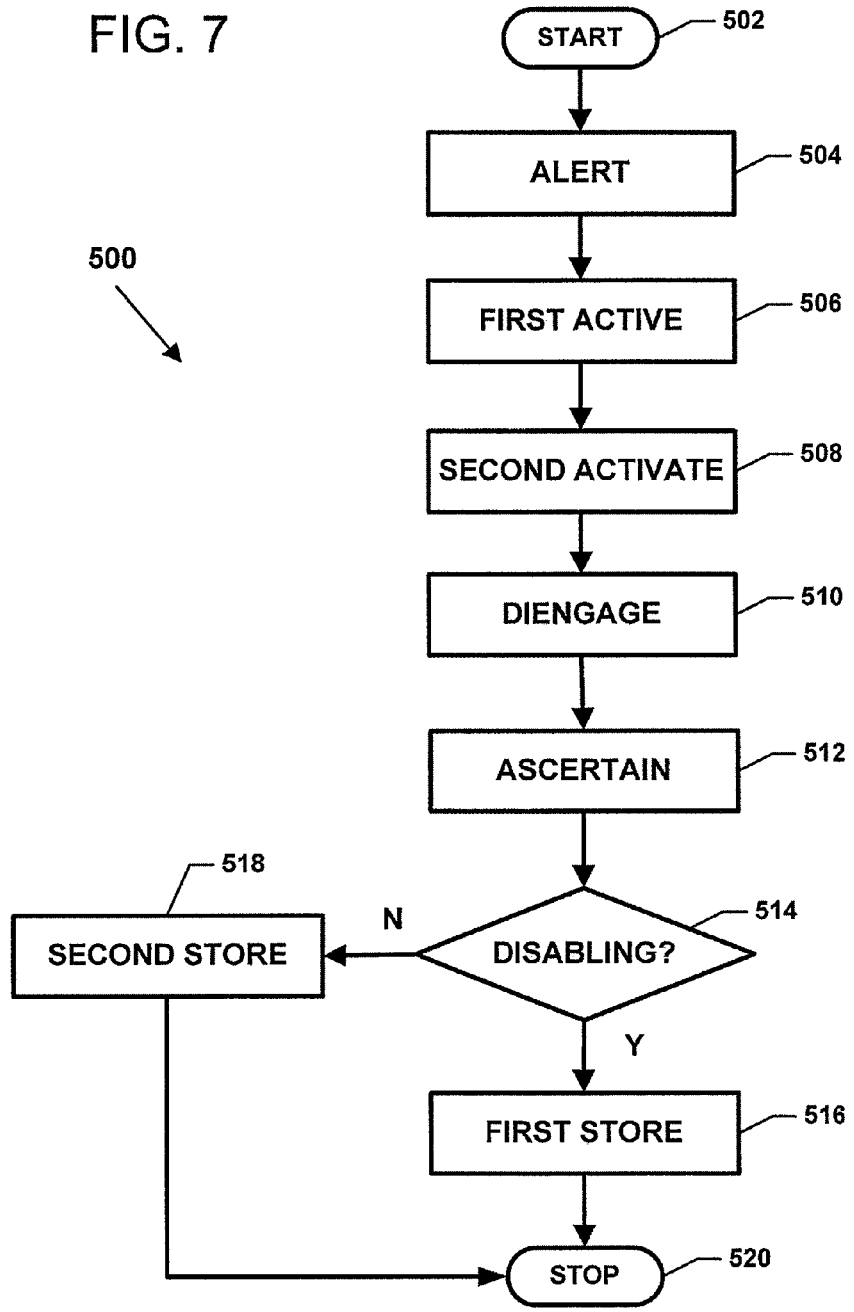
FIG. 7 is a flowchart illustrating an operational flow for an example response process according to which the second power source control system responds when a new fault condition is detected in accordance with the principles of the present disclosure.

FIG. 7 is a flowchart illustrating an operational flow for an example response process 500 according to which the second power source control system 152 responds when a new fault condition is detected. The response process 500 performs any appropriate initialization procedures, begins at a start module 502, and proceeds to an alert operation 504.

The alert operation 504 provides an indication to the user (e.g., driver) that a fault condition has occurred. In accordance with some aspects, the alert operation 504 activates one or more alert indicators 190 in the vehicle (e.g., on a dashboard of the vehicle). Non-limiting examples of alert indicators 190 can include a lighted symbol 192, a text readout on a display screen, and/or a speaker 194 configured to emit an audible signal. For example, in accordance with one aspect, the alert operation 504 can provide power to a lighted indicator displayed to the user of the vehicle.

A first activate operation 506 moves the swash plate 148 of the pump/motor unit 142 (FIG. 2) to a neutral (e.g., vertical) position. For example, the first activate operation 506 can send a control signal (e.g., an electrical signal) from the response module 206 to the swash control valve 224 (FIG. 4) to zero out the swash plate 148 to the neutral position. Zeroing out the swash plate 148 can aid in inhibiting an overspeed condition in the pump/motor unit 142 that could damage the second power source 142. Zeroing out the swash plate 148 also can aid in removing torque from the drive line 130.

A second activate operation 508 opens a bypass between the pump/motor high pressure port and the reservoir 144 (see FIG. 2). For example, the second activate operation 508 can send a control signal (e.g., an electrical signal) from the response module 206 to the bypass valve 222 (FIG. 4) to allow fluid to bypass the pump/motor unit 142. Opening the bypass valve 222 can aid in removing torque from the drive line 130. In accordance with some aspects, the second activate operation 440 operates the bypass valve 222 a predetermined period of time after the first activate operation 504 zeroes out the swash plate 148. In accordance with other aspects, the second activate operation 506 operates the bypass valve 222 after the swash plate position sensors A disengage operation 510 operationally decouples the second power source 124 from the hybrid drive assembly 102. When operationally decoupled, the second power source 124 does not provide power to the vehicle. In accordance with some aspects, the disengage operation 510 operates the clutch valve 224 of the engagement assembly 149 to disengage the second power source 124 from the drive line 130. In accordance with one aspect, the disengage operation 510 operates the clutch valve 224 at substantially the same time that the second activate operation 508 opens the bypass. In accordance with other aspects, however, the disengage operation 510 can disengage the second power source 124 from the drive line 130 prior to or subsequent to implementation of the first and second activate operations 506, 508.

An ascertain operation 512 determines the type of fault condition detected. In accordance with aspects, the ascertain operation 512 determines whether the fault condition is a non-latching fault 186, a latching fault 184, or a disabling fault 182. If a determination module 514 determines that the newly detected fault condition is a disabling fault, then a first storage operation 516 saves a record of the disabling fault condition in non-volatile memory, such as non-volatile memory 167 (FIG. 3). If the determination module 515 determines that the newly detected fault condition is not a disabling fault, however, then a second storage operation 518 saves a record of the fault condition in volatile memory, such as volatile memory 168 (FIG. 3).

The response process 500 performs any appropriate completion procedures and ends at a stop module 520.

Figure 8:
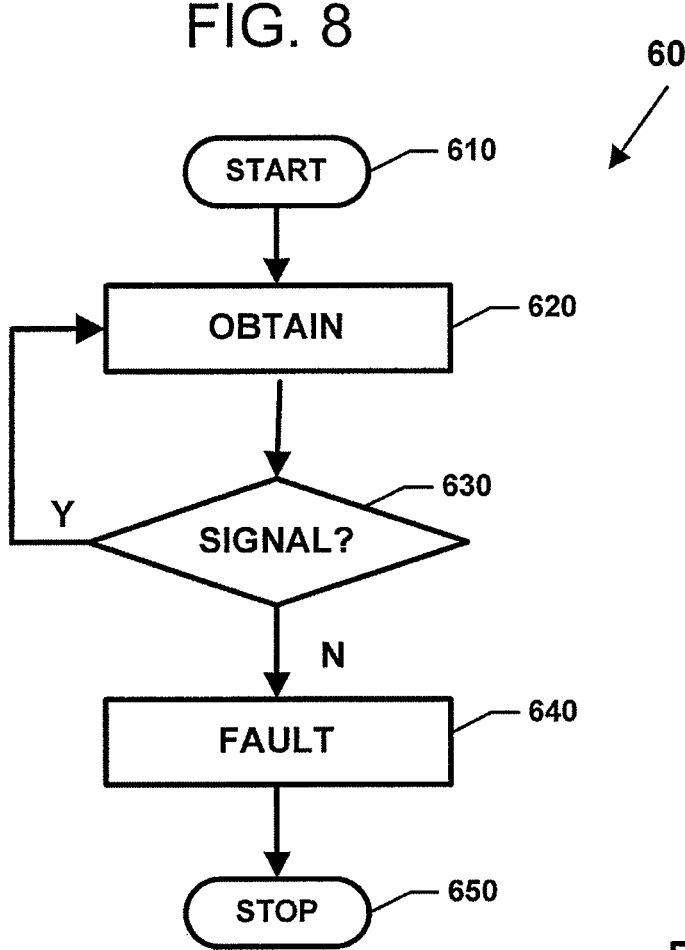
FIG. 8 is a flowchart illustrating an operational flow for an example network fault detection process by which a fault detection system can identify a network fault condition in accordance with the principles of the present disclosure.

FIG. 8 is a flowchart illustrating an operational flow for an example network fault detection process 600 by which the monitoring module 201 of the fault detection system 200 of FIG. 4 can identify a network fault condition. In accordance with one aspect, a network fault condition is a non-latching fault. In accordance with other aspects, however, the network fault condition can be a latching or disabling fault.

The network fault detection process 600 performs any appropriate initialization procedures, begins at a start module 610, and proceeds to a listen operation 620. The listen operation 620 checks whether data is being received from the communications network 184. For example, the listen operation 620 can determine a parameter or messages expected to be received.

A determination module 630 determines whether data is being received from the communications network 184. In accordance with some aspects, when the determination module 630 determines that data is not being received, a fault operation 640 triggers a response process, such as response process 500 of FIG. 7. In accordance with one aspect, the fault operation 640 also can store a network communication fault condition in memory. The network fault detection process 600 performs any appropriate completion procedures and ends at a stop module 650.

Figure 9:
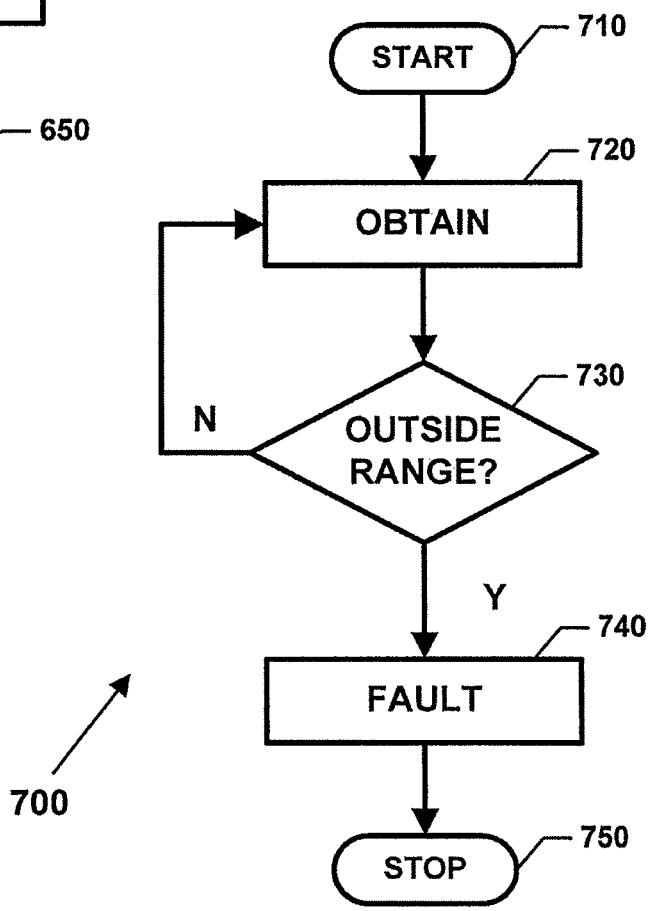
FIG. 9 is a flowchart illustrating an operational flow for an example range fault detection process by which a fault detection system can identify out-of-range fault conditions in accordance with the principles of the present disclosure.

FIG. 9 is a flowchart illustrating an operational flow for an example range fault detection process 700 by which the monitoring module 201 of the fault detection system 200 of FIG. 4 can identify out-of-range fault conditions. Non-limiting examples of out-of-range fault conditions can include: received sensor signals that are outside a normal operating range, which can indicate component and/or system malfunctions; received sensor signals outside a possible sensing range, which can indicate sensor and/or wiring issues; and measured valve current, which can indicate valve malfunctions.

The range fault detection process 700 performs any appropriate initialization procedures, begins at a start module 710, and proceeds to an obtain operation 720. The obtain operation 720 receives one or more data signals from one or more sensors, such as sensors 211-219 of FIG. 2.

A determination module 730 determines whether any of the received data signals has a value outside (e.g., above or below) a predetermined threshold. In accordance with some embodiments, the determination module 730 determines whether each data signal has a value outside a predetermined threshold stored in memory (e.g., memory 167 of control system 152). In accordance with one aspect, the determination module 730 can determine whether the data signals remains outside the threshold for a predetermined period of time.

In accordance with some aspects, when the first determination module 730 determines that a received data signal is outside the predetermined threshold, a fault operation 740 triggers a response process, such as response process 500 of FIG. 7. In accordance with one aspect, the fault operation 740 also can store a network communication fault condition in memory. The range fault detection process 700 performs any appropriate completion procedures and ends at a stop module 750.

Figure 10:
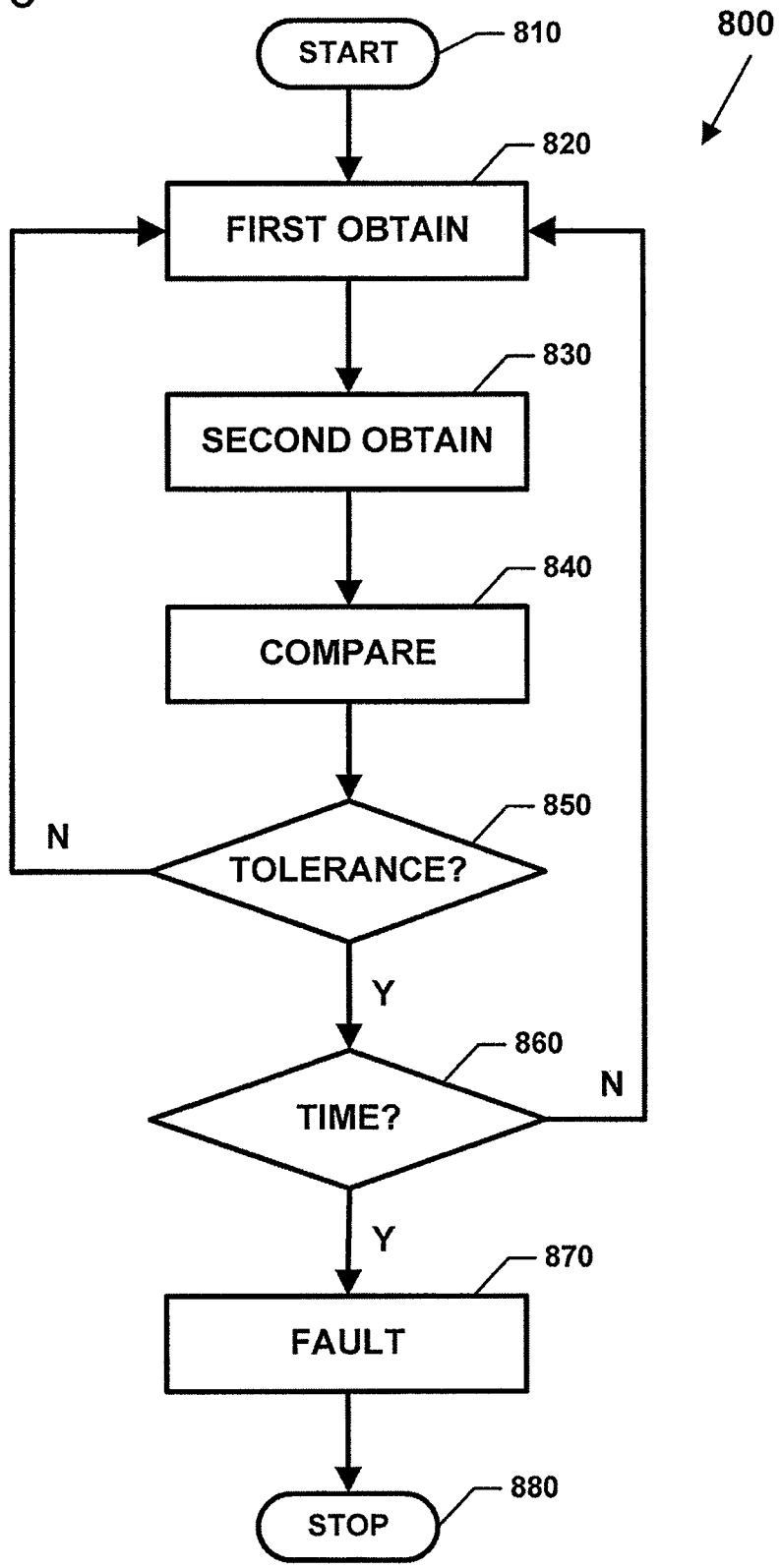
FIG. 10 is a flowchart illustrating an operational flow for an example miscompare fault detection process by which a fault detection system can identify fault conditions triggered by conflicting sensor readings or commands in accordance with the principles of the present disclosure.

FIG. 10 is a flowchart illustrating an operational flow for an example miscompare fault detection process 800 by which the monitoring module 201 of the fault detection system 200 of FIG. 4 can identify fault conditions triggered by conflicting sensor readings or commands. Non-limiting examples of such fault conditions can include: a conflict between the speed reported by the pump speed sensor and the output shaft speed sensor; a conflict between the swash plate orientation reported by two or more swash plate sensors; a conflict between the swash plate orientation reported by the swash plate sensors and the commanded swash angle; and a conflict between the clutch status reported by the clutch valve sensor and the commanded clutch status.

The miscompare fault detection process 800 performs any appropriate initialization procedures, begins at a start module 810, and proceeds to a first obtain operation 820. The first obtain operation 820 receives a first data signal from a sensor, such as sensors 211-219 of FIG. 2, indicating a status of the system or component thereof. In accordance with one aspect, the first obtain operation 820 can receive the first data signal through the communications network 184. In accordance with another aspect, the first obtain operation 820 can receive the first data signal from a direct line to the sensor.

A second obtain operation 830 obtains a second data signal indicating a status of the system or component thereof. In accordance with some aspects, the second obtain operation 830 obtains the second data signals from a sensor, such as sensors 211-219 of FIG. 2. In accordance with other aspects, the second obtain operation 830 can obtain the second data signals from the communications network 184 or memory. In accordance with one aspect, the second data signal can be a command or control signal provided to a valve (e.g., to the solenoid controlling the valve).

A compare operation 840 determines whether a conflict exists between the data signals received by the first obtain operation 820 and the data signal received by the second obtain operation 820. For example, in accordance with some aspects, the compare operation 840 can determine a difference between the data signals. For example, in accordance with one aspect, the compare operation 840 determines a difference between a swash plate angle value reported by one swash plate sensor and a swash plate angle value reported by another swash plate sensor. In accordance with other aspects, the compare operation 840 determines whether a binary value of the first data signal matches a binary value of the second data signal. For example, in accordance with some aspects, the compare operation 840 can determine whether the status of the clutch as reported by the clutch valve matches the most recent command sent to the clutch valve.

A first determination module 850 determines whether any of the conflicts are sufficient to trigger a fault condition. In accordance with some embodiments, the first determination module 850 determines whether the difference between each conflicting set of data signals exceeds system tolerances stored in memory (e.g., memory 167 of control system 152). A second determination module 860 determines whether any of the conflicts that exceed system tolerances persist for a predetermined period of time.

In accordance with some aspects, when the first and second determination modules 850, 860 determine that a conflict between two data signal exceeds system tolerances and persists for a predetermined period of time, a fault operation 870 triggers a response process, such as response process 500 of FIG. 7. In accordance with one aspect, the fault operation 870 also can store a network communication fault condition in memory. The miscompare fault detection process 800 performs any appropriate completion procedures and ends at a stop module 880.

Figure 11:
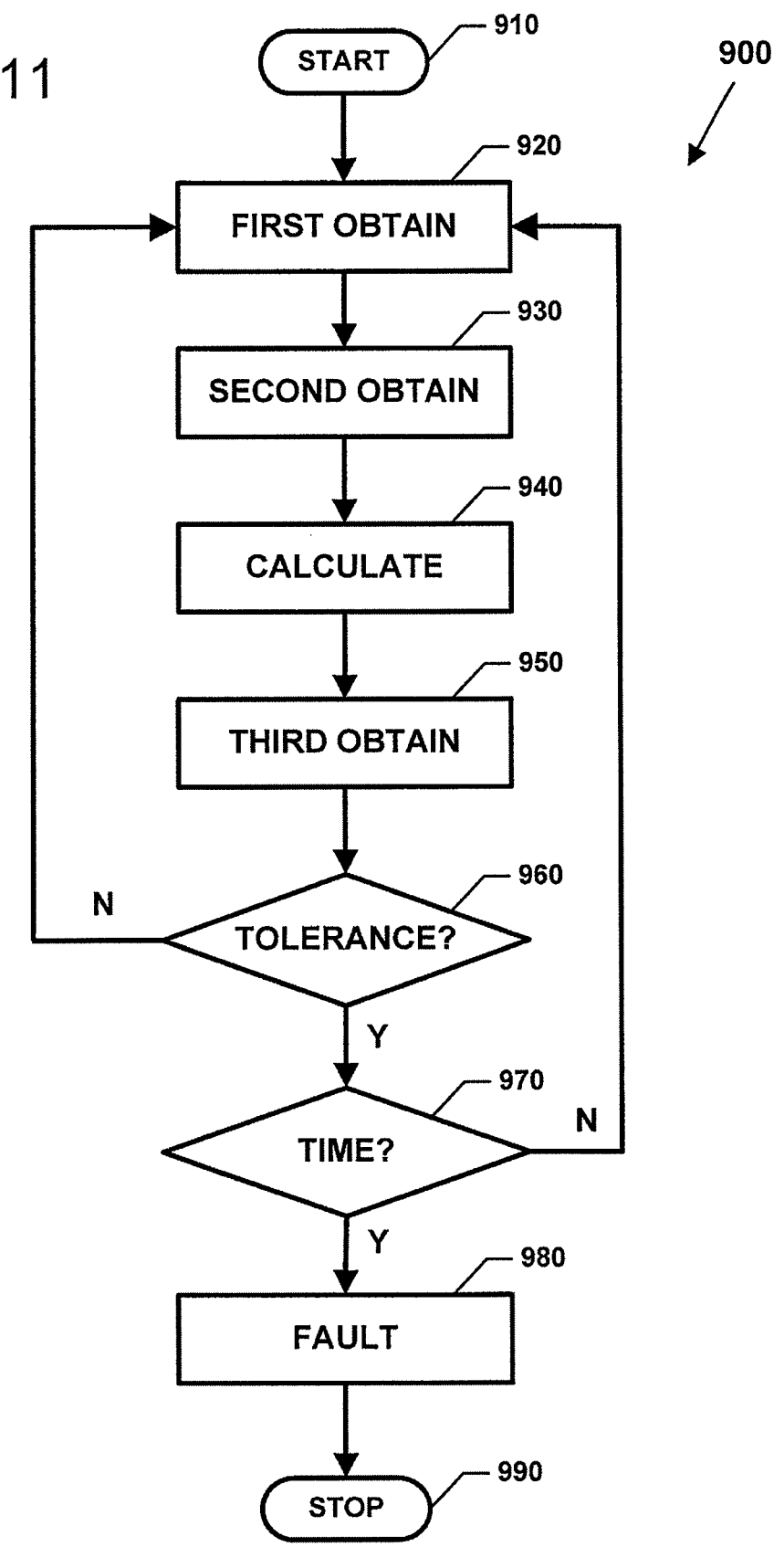
FIG. 11 is a flowchart illustrating an operational flow for an example filter clog fault detection process by which a fault detection system can detect a clogged filter in accordance with the principles of the present disclosure.

FIG. 11 is a flowchart illustrating an operational flow for an example filter clog fault detection process 900 by which the monitoring module 201 of the fault detection system 200 of FIG. 4 can detect a clogged filter, such as filter 147 of the second power source 124.

The filter clog fault detection process 900 performs any appropriate initialization procedures, begins at a start module 910, and proceeds to a first obtain operation 920. The first obtain operation 920 receives a first data signal from a fluid temperature sensor, such as fluid temperature sensor 212 of FIG. 2. In accordance with one aspect, the first obtain operation 920 can receive the first data signal through the communications network 184. In accordance with another aspect, the first obtain operation 920 can receive the first data signal from a direct line to the fluid temperature sensor 212.

A second obtain operation 930 obtains a second data signal from a pump speed sensor, such as pump speed sensor 217 indicating a pump speed. In accordance with some aspects, the second obtain operation 930 obtains the pump speed data signals directly from the pump speed sensor 217. In accordance with other aspects, the second obtain operation 930 can obtain the pump speed data signals from the communications network 184.

A calculate operation 940 determines an allowable filter pressure based on the fluid temperature and pump speed provided by the first and second obtain operations 930, 940. In accordance with one aspect, the allowable filter pressure is calculated based on tests results obtained from experimentation.

A third obtain operation 950 obtains a third data signals from a filter pressure sensor, such as filter pressure sensor 214 of FIG. 2. In accordance with some aspects, the third obtain operation 950 obtains the filter pressure data signals directly from the filter pressure sensor 214. In accordance with other aspects, the third obtain operation 950 can obtain the filter pressure data signals from the communications network 184.

A first determination module 960 compares the filter pressure provided by the third obtain operation 950 with the allowable filter pressure provided by the calculate operation 940. In accordance with some aspects, the first determination module 960 also determines whether the filter pressure exceeds the calculated allowable filter pressure by an amount sufficient to trigger a fault condition. A second determination module 970 determines whether the filter pressure exceeds the calculated allowable filter pressure beyond a predetermined tolerance for a predetermined period of time.

In accordance with some aspects, when the first and second determination modules 960, 970 determine that the filter pressure exceeds the allowable filter pressure beyond system tolerances and for longer than a predetermined period of time, a fault operation 980 triggers a response process, such as response process 500 of FIG. 7. In accordance with one aspect, the fault operation 980 also can store a network communication fault condition in memory. The filter clog fault detection process 900 performs any appropriate completion procedures and ends at a stop module 990.

Figure 12:
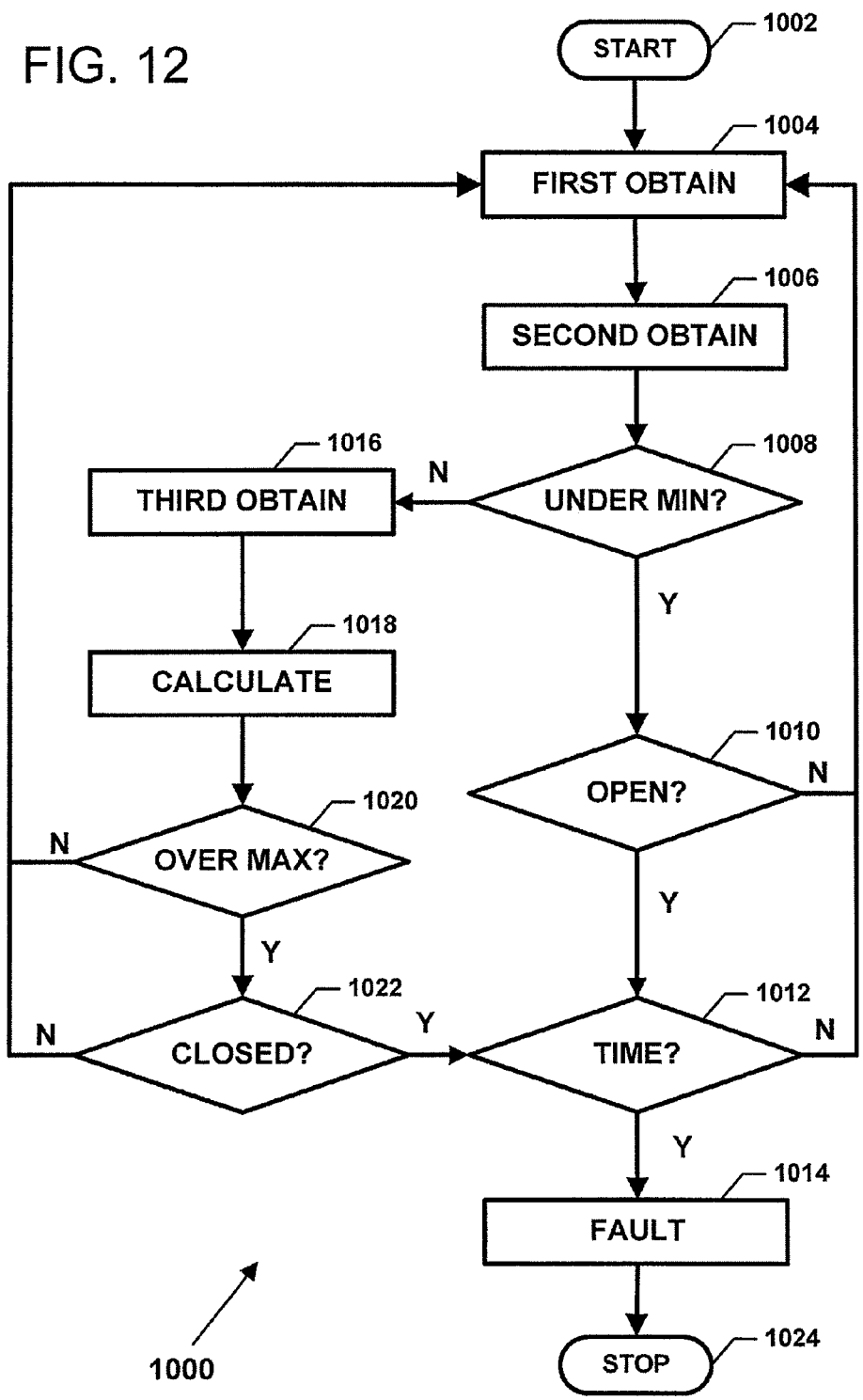
FIG. 12 is a flowchart illustrating an operational flow for an example foot valve fault detection process 1000 by which a fault detection system can detect a malfunction in the proximity sensor on the accumulator in accordance with the principles of the present disclosure.

FIG. 12 is a flowchart illustrating an operational flow for an example foot valve fault detection process 1000 by which the monitoring module 201 of the fault detection system 200 of FIG. 4 can detect a malfunction in the proximity sensor on the accumulator, such as proximity sensor 216 of FIG. 2. The foot valve fault detection process 1000 performs any appropriate initialization procedures, begins at a start module 1002, and proceeds to a first obtain operation 1004.

The first obtain operation 1004 receives a first data signal from an accumulator pressure sensor, such as accumulator pressure sensor 215 of FIG. 2. In accordance with one aspect, the first obtain operation 1004 can receive the first data signal through the communications network 184. In accordance with another aspect, the first obtain operation 1004 can receive the first data signal from a direct line to the accumulator pressure sensor 215.

A second obtain operation 1006 obtains a second data signal from the proximity sensor 216. In accordance with some aspects, the second obtain operation 1006 obtains a data signal representing the status of the foot valve 236 directly from the proximity sensor 216. In accordance with other aspects, the second obtain operation 1006 can obtain the foot valve data signals from the communications network 184.

A first determination module 1008 determines whether the accumulator pressure data signal is outside an acceptable range. For example, in accordance with one aspect, the first determination module 1008 determines whether the accumulator pressure data signal is lower than a predetermined lower limit.

If the first determination module 1008 determines that the accumulator pressure data signal is below the predetermined threshold, then a second determination module 1010 determines whether the proximity sensor data signal indicates that the foot valve 236 is open. In accordance with one aspect, an accumulator pressure below the predetermined threshold while the foot valve is open indicates a first fault condition.

If the second determination module 1010 determines that the proximity sensor data signal indicates that the foot valve 236 is open, thereby indicating the first fault condition, then a third determination module 1012 determines whether the fault condition persist for a predetermined period of time. In accordance with some aspects, when the third determination module 1012 determines that the fault condition persists for longer than a predetermined period of time, a fault operation 1014 triggers a response process, such as response process 500 of FIG. 7.

If the first determination module 1008 determines that the accumulator pressure data signal is within an acceptable range, however, then the foot valve fault detection process 1000 proceeds to a third obtain operation 1016. The third obtain operation 1016 receives a data signal from a fluid temperature sensor, such as fluid temperature sensor 212 of FIG. 2. A calculate operation 1018 determines an allowable accumulator pressure based on the fluid temperature provided by the third obtain operation 1016.

A fourth determination module 1020 determines whether the accumulator pressure provided by the first obtain operation 1004 exceeds the calculated allowable accumulator pressure provided by the calculate operation 1018. If the fourth determination module 1020 determines that the first obtain operation 1004 does exceed the allowable accumulator pressure, then a fifth determination module 1022 determines whether the proximity sensor data signal indicates that the foot valve is closed. In accordance with one aspect, an accumulator pressure above the calculated allowable pressure while the foot valve is closed indicates a second fault condition.

If the fifth determination module 1022 determines that the foot valve 236 is closed, thereby indicating the second fault condition, then the foot valve fault detection process 1000 proceeds to the third determination module 1012 and continues as disclosed above. If one or more of the second, third, fourth, and fifth determination modules 1010, 1012, 1020, 1022 determines a fault condition is not met, however, then the foot valve fault detection process 1000 cycles back to the first obtain operation 1004 to begin again. The foot valve fault detection process 1000 performs any appropriate completion procedures and ends at a stop module 1024.

Figure 13:
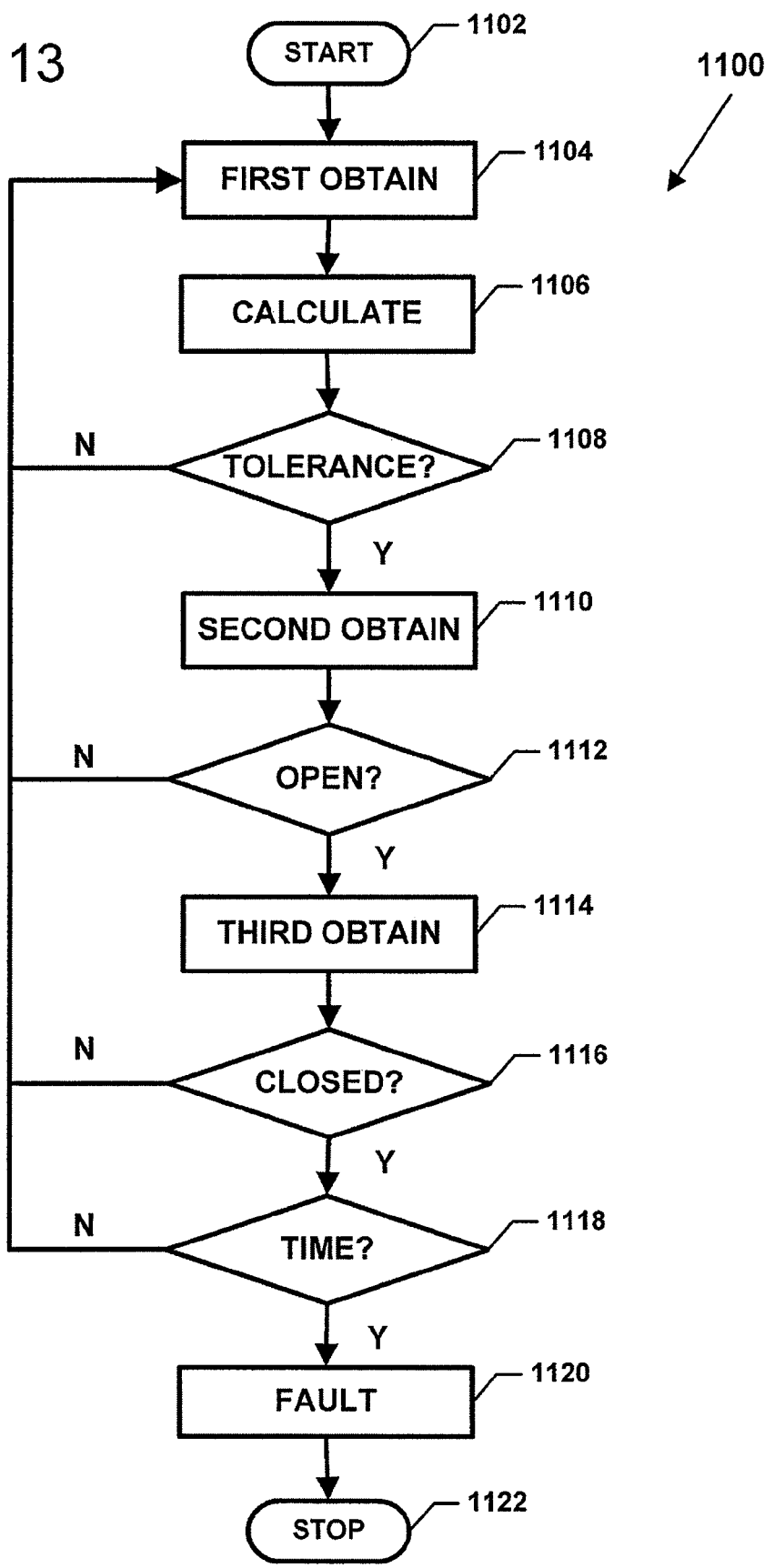
FIG. 13 is a flowchart illustrating an operational flow for an example pressure leak fault detection process by which a fault detection system can detect a high pressure leak in accordance with the principles of the present disclosure.

FIG. 13 is a flowchart illustrating an operational flow for an example pressure leak fault detection process 1100 by which the monitoring module 201 of the fault detection system 200 of FIG. 4 can detect a high pressure leak. The pressure leak fault detection process 1100 performs any appropriate initialization procedures, begins at a start module 1102, and proceeds to a first obtain operation 1104.

The first obtain operation 1104 receives a first data signal from an accumulator pressure sensor, such as accumulator pressure sensor 215 of FIG. 2. In accordance with one aspect, the first obtain operation 1104 can receive the first data signal through the communications network 184. In accordance with another aspect, the first obtain operation 1104 can receive the first data signal from a direct line to the accumulator pressure sensor 215.

A calculate operation 1106 finds a slope of the accumulator pressure as provided by the first obtain operation 1104 plotted against time. In accordance with one aspect, the calculate operation 1106 also takes the absolute value of the slope. A first determination module 1108 determines whether the calculated slope value exceeds a predetermined threshold. If the first determination module 1108 determines that the threshold is not exceeded, then the pressure leak fault detection process 1100 cycles back to the first obtain operation 1104 to begin again.

If the first determination module 1108 determines that the calculated slope value exceeds the predetermined threshold, however, then a second obtain operation 1110 obtains a second data signal from a proximity sensor on the accumulator, such as proximity sensor 216 of FIG. 2. In accordance with some aspects, the second obtain operation 1110 obtains the foot valve data signals directly from the foot valve sensor. In accordance with other aspects, the second obtain operation 1110 can obtain the foot valve data signals from the communications network 184.

A second determination module 1112 determines whether the foot valve data signal provided by the second obtain operation 1110 indicates that the foot valve is open. If the second determination module 1112 determines that the foot valve data signal indicates that the foot valve is closed, then the pressure leak fault detection process 1100 cycles back to the first obtain operation 1104 to begin again. If the second determination module 1112 determines that the foot valve data signal indicates that the foot valve is open, however, then a third obtain operation 1114 receives a data signal indicating whether the mode valve is open or closed. In accordance with some aspects, the third obtain operation 1114 obtains the mode valve data signals directly from a mode valve sensor. In accordance with other aspects, the third obtain operation 1114 can obtain the mode valve data signals from the communications network 184.

If a third determination module 1116 determines the mode valve data signal indicates that the mode valve is open, then the pressure leak fault detection process 1100 cycles back to the first obtain operation 1104 to begin again. If the third determination module 1116 determines the mode valve data signal indicates that the mode valve is closed, however, then a fourth determination module 1118 determines whether the accumulator pressure has exceeded the threshold while the foot valve is open and the mode valve is closed for a predetermined period of time.

In accordance with some aspects, when the fourth determination module 1118 determines that the fault condition persists for longer than a predetermined period of time, a fault operation 1120 triggers a response process, such as response process 500 of FIG. 7. The pressure leak fault detection process 1100 performs any appropriate completion procedures and ends at a stop module 1122.

Figure 14:
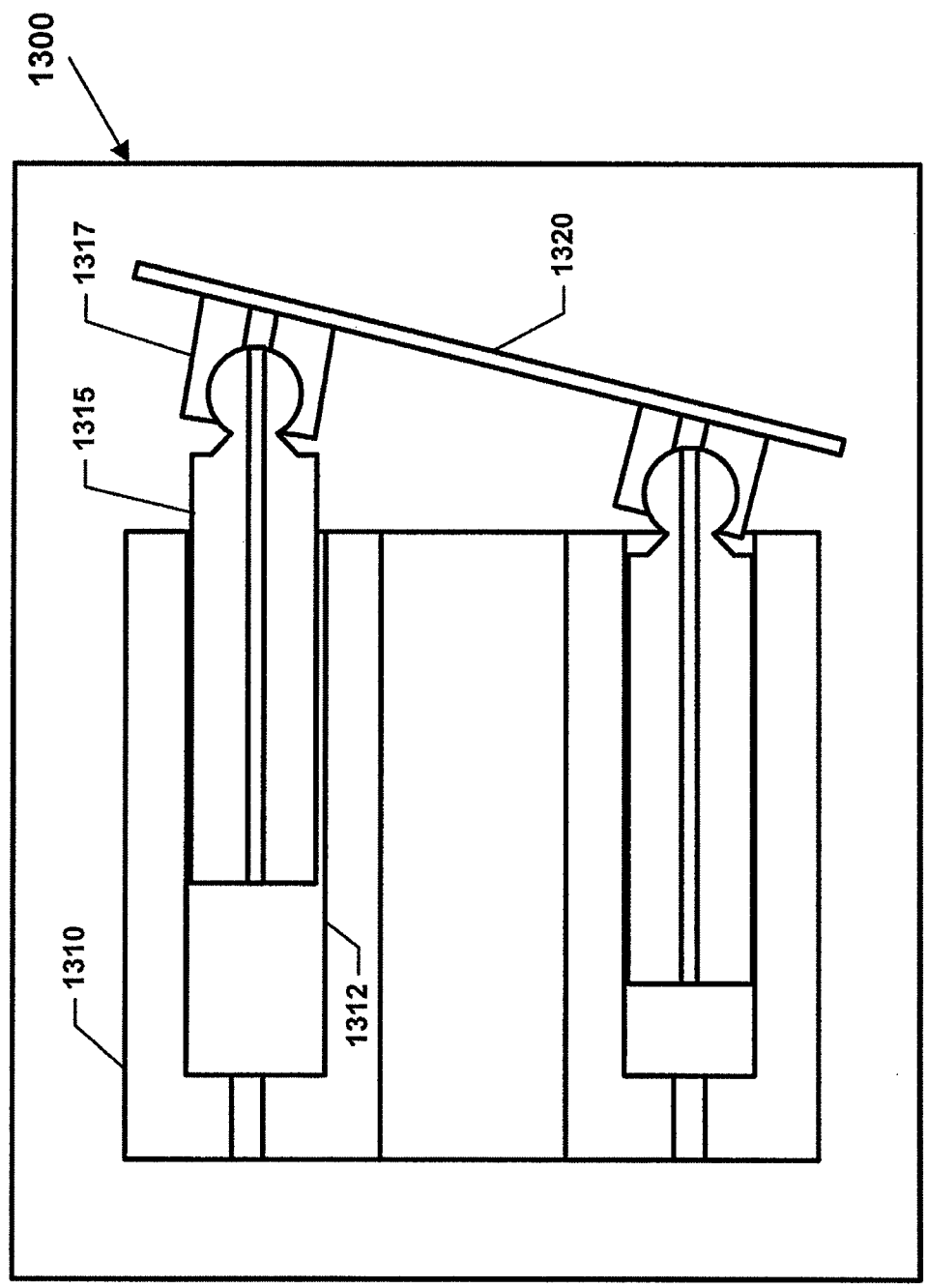
FIG. 14 is a schematic representation of an example pump assembly that can be used in a pump/motor unit in accordance with the principles of the present disclosure.

FIG. 14 is a schematic representation of an example pump assembly 1300 that can be used in a pump/motor unit, such as pump/motor unit 142 of FIGS. 1 and 2. The pump assembly 1300 includes a pump body 1310 defining multiple bores 1312 in which pistons 1315 can be axially displaced by a swash plate 1320. Each piston 1315 interacts with the swash plate 1320 via a shoe 1317. Over time, the pump body 1310 can develop leakage between the bores 1312 and the pistons 1315, between the pistons 1315 and the shoes 1317, between the shoes 1317 and the swash plate 1320, and/or between the bore and the pump case (e.g., from a cracked barrel).

In accordance with some aspects, a leak in the pump body assembly 1300 will generate a pulse of fluid into the pump case once per revolution of the pump body 1310. The pulse of fluid generates a pressure spike in the case or at the filter pressure sensor. The pressure spike occurs at a frequency equal to the frequency at which the barrel rotates. In accordance with one aspect, the data signal from the filter pressure sensor is filtered and analyzed to determine whether a barrel leak is occurring. In accordance with another aspect, the data signal from a case pressure sensor is filtered and analyzed to determine whether a barrel leak is occurring.

Figure 15A:
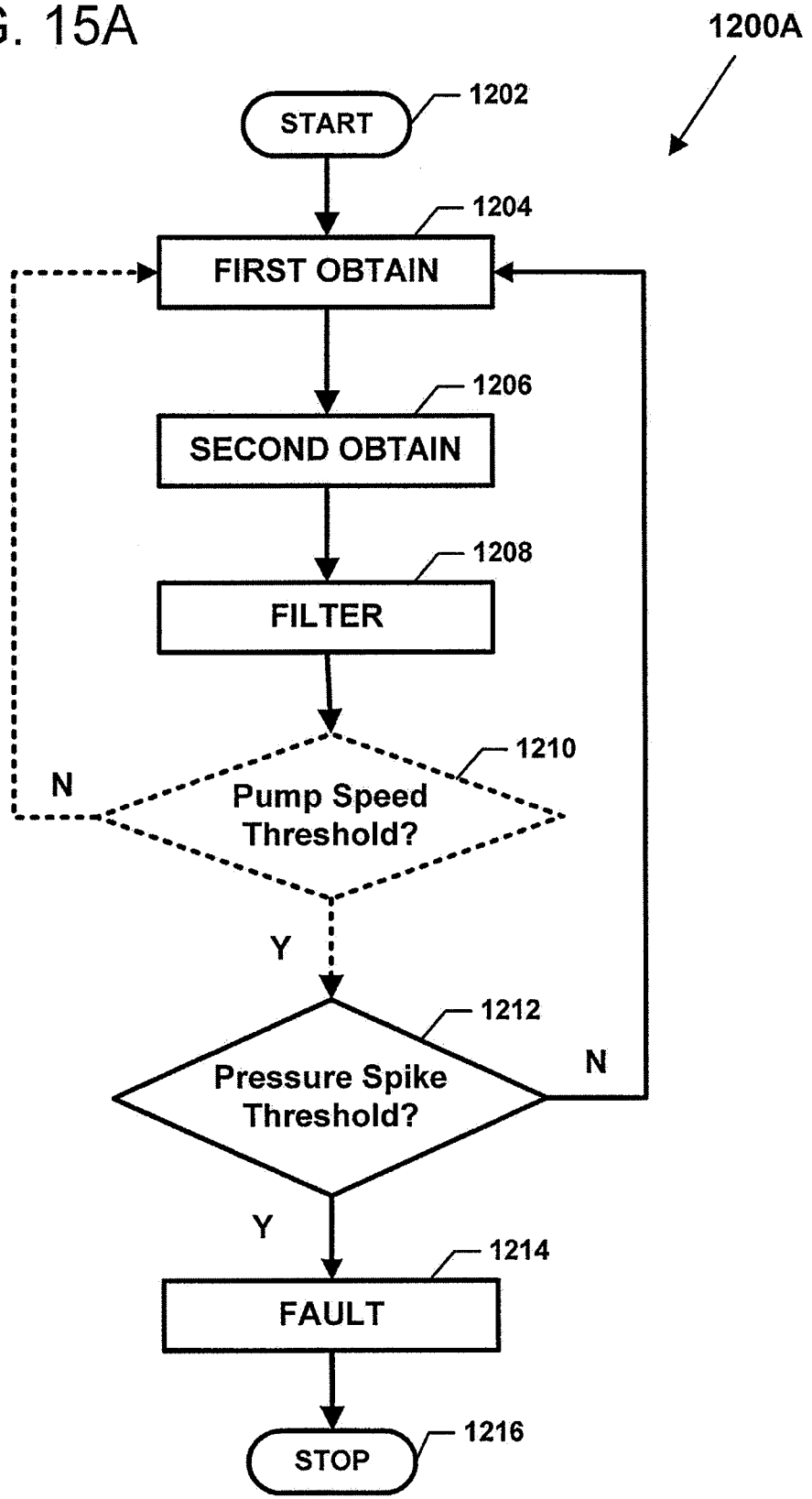
FIG. 15A is a flowchart illustrating an operational flow for an example leak detection process by which a barrel leak, such as a barrel leak in a pump assembly, can be detected in accordance with the principles of the present disclosure.

FIG. 15A is a flowchart illustrating an operational flow for an example leak detection process 1200A by which a barrel leak, such as a barrel leak in pump assembly 1300 of FIG. 14, can be detected. In accordance with some implementations, the leak detection process 1200A is implemented on a pump used in a hybrid vehicle as described above. In accordance with other implementations, however, the leak detection process 1200A can be used with any type of pump (e.g., any axial piston pump) having the appropriate sensors to measure pump speed and case pressure.

The leak detection process 1200A performs any appropriate initialization procedures, begins at a start module 1202, and proceeds to a first obtain operation 1204. In accordance with one aspect, the first obtain operation 1204 determines a pressure of the fluid associated with second power source 124. For example, in one implementation, the first obtain operation 1204 receives a data signal from a filter pressure sensor, such as filter pressure sensor 214 of FIG. 2. In accordance with another aspect, the first obtain operation 1204 receives a data signal from the case pressure sensor.

A second obtain operation 1206 determines a frequency of the pump/motor. For example, in one implementation, the second obtain operation 1206 receives a data signal from a pump speed sensor, such as pump speed sensor 217 of FIG. 2. In accordance with one aspect, the second obtain operation 1206 converts the pump speed data signal to a frequency value (e.g., changes RPM to Hz by dividing the pump speed by sixty). In other implementations, the second obtain operation 1206 can otherwise determine the frequency of the pump.

A filter operation 1208 removes pressure pulses from the obtained signal to obtain a filtered signal. For example, in accordance with some aspects, the filter operation 1208 filters out pulses that do not occur at a constant speed if the pump is spinning at a constant speed. In accordance with other aspects, the filter operation 1208 removes pressure pulses that occur at a frequency different from the frequency at which the pump is rotating. For example, the filter operation 1208 can filter out pulses occurring at higher and/or lower frequencies than the pump frequency. In certain implementations, the filter operation 1208 uses a roll off filter to remove such pulses.

For example, in accordance with some embodiments, the filter operation 1208 can pass the data signal from the first obtain operation 1204 through a high-pass filter (e.g., a butterworth filter) to mitigate noise from standard leakage, stop-and-go cycles, etc. The filter operation 1208 also can rectify the signal obtained from the high-pass filter to obtain a substantially discrete signal. In certain implementations, the filter operation 1208 also can pass the pressure sensor signal (i.e., or the rectified signal) through a low-pass filter. In accordance with one aspect, the high-pass and low-pass filters can be tuned based on experimentally determined values for pump frequency.

In other implementations, the data signal from the first obtain operation 1204 can be passed through a band pass filter to obtain the filtered signal. The band pass filter can be configured based on the configuration of the pump, the strength of the ripple in the obtained signal, and/or other frequencies (e.g., vibrations or other noise) originating from other components in the system. For example, in one implementation, the filter operation 1208 can filter out any frequencies that are about 20% above or below of the pump frequency. In another implementation, the filter operation 1208 filters rolls off any frequencies that are about 10% above or below of the pump frequency. In certain implementations, the filter operation 1208 uses only a low pass filter. For example, is accordance with some aspects, when the pump is operating below a threshold spin speed (e.g., about 500 RPM), the filter operation 1208 may use only a low pass filter to roll off pulses at higher frequencies.

An optional (see dashed lines) pump speed determination module 1210 determines whether the pump rotation reaches a predetermined frequency. In some implementations, the pressure pulses from the leak occur too quickly above a particular pump speed to be sampled accurately. In such implementations, the pump speed determination module 1210 guards against nuisance faults when the pump is spinning at a speed outside the detectable range. Accordingly, if the first determination module 1210 determines that the pump speed from the second obtain operation 1206 is greater than a maximum speed threshold, then the leak detection process 1200 cycles back to the first obtain operation 1204 to begin again.

If the first determination module 1210 determines that the pump speed is less than a maximum speed threshold, however, then the leak detection process 1200 proceeds to a second determination module 1212. In other implementations, the sensors (e.g., filter sensor 214 of FIG. 2) are sufficiently accurate to render the pump speed determination module 1210 unnecessary. In such implementations, the leak detection process 1200A proceeds from the filter operation 1208 to the pressure spike determination module 1212.

The pressure spike determination module 1212 determines whether the filtered signal exceeds a predetermined threshold. In accordance with some aspects, the threshold is determined experimentally and stored electronically (e.g., in memory 167 of the second power source control system 152 of FIG. 3). For example, in one implementation, the second determination module 1212 can obtain the threshold value from memory over the CAN bus 184.

For example, in some implementations, the pressure spike threshold can be selected by running a pump with a known leak and mapping the pressure spikes during operation. In certain implementations, the threshold is set as the magnitude of the experimentally measured pressure spike plus or minus a tolerance. In other implementations, the threshold is set at a percentage (e.g., 10%, 15%, 25%, 50%, 75%, etc.) of the magnitude of the experimentally measured pressure spike. In other implementations, the threshold is selected based on pressure spikes that would occur with a pump operating at ideal conditions. For example, the threshold can be selected to be the pressure spikes experimentally obtained under ideal conditions plus some percentage (25%, 50%, 75%, 100%, 150%, etc.) thereof.

In accordance with some aspects, the pressure spikes occurring at the pump frequency are mapped out for different operating conditions. Accordingly, the pressure spike thesholds can be mapped for different operating conditions. For example, the pressure spikes can be mapped for different swash angle positions and/or for different pressure readings. The map can be used to determine the threshold value to be used for a given set of operating parameters. In such cases, the leak detection process 1200A determines the operating parameters and the pressure spike threshold module 1212 compares the filtered signal to the threshold value for those operating parameters. An alternative process is shown in FIG. 15B and discussed herein.

If the pressure spike determination module 1212 determines that the filtered signal does not exceed the pressure spike threshold, then the leak detection process 1200A cycles back to the first obtain operation 1204 to begin again. If the pressure spike determination module 1212 determines that the filtered signal exceeds the pressure spike threshold, however, then a fault operation 1214 triggers a response process, such as response process 500 of FIG. 7. In accordance with one aspect, the fault operation 1214 determines the leak constitutes a disabling fault. The leak detection process 1200A performs any appropriate completion procedures and ends at a stop module 1216.

FIG. 15B is a flowchart illustrating an operational flow for another example leak detection process 1200B by which a barrel leak, such as a barrel leak in pump assembly 1300 of FIG. 14, can be detected. In accordance with some implementations, the leak detection process 1200B is implemented on a pump used in a hybrid vehicle as described above. In accordance with other implementations, however, the leak detection process 1200B can be used with any type of pump (e.g., any axial piston pump) having the appropriate sensors to measure pump speed and case pressure. The leak detection process 1200B may be used as an alternative to leak detection process 1200A of FIG. 15A. The leak detection process 1200B differs from the leak detection process 1200A by storing a pressure spike threshold for only certain operating parameters (instead of a 3D map for substantially all operating parameters).

The leak detection process 1200B performs any appropriate initialization procedures, begins at the start module 1202, and proceeds to a first determination module 1201. The first determination module 1201 determines whether the current operating parameters of the pump (i.e., or the vehicle) fall within a tolerated range. For example, in some implementations, the first determination module 1201 obtains data signals from the appropriate sensors to determine current operating conditions of the pump and/or vehicle. For example, in certain implementations, the first determination module 1201 obtains data signals representing the current swash angle and/or the current filter pressure. The first determination module 1201 also determines whether a pressure spike threshold associated with the current operating conditions is stored, e.g., in the memory 167 of the second power source control system 152 of FIG. 3. Operating conditions that do not have an associated threshold value are outside the tolerated range.

If the first determination module 1201 determines that no pressure spike threshold value is stored for the current operating conditions, then the leak detection process 1200B cycles back to the start operation 1202 to begin again. Accordingly, the first determination module 1201 guards against nuisance faults. If the first determination module 1201 determines that a pressure spike value is stored for the current operating conditions, however, then the leak detection process 1200B proceeds to the first obtain operation 1204. The implementation of operations 1204 through 1214 of leak detection process 1200B is substantially the same as the implementation of operations 1204 through 1214 of leak detection process 1200A.

In the leak detection process 1200B, the pressure spike determination module 1212 determines whether the filtered signal exceeds a predetermined threshold associated with the operating conditions determined at the first determination module 1201. In accordance with some aspects, the pressure spike threshold is determined experimentally (e.g., using any of the processes discussed above with respect to FIG. 15A) and stored electronically (e.g., in memory 167 of the second power source control system 152 of FIG. 3). For example, in one implementation, the second determination module 1212 can obtain the threshold value from memory over the CAN bus 184.

If the second determination module 1212 determines that the filtered signal does not exceed the pressure spike threshold, then the leak detection process 1200 cycles back to the first obtain operation 1204 to begin again. If the second determination module 1212 determines that the filtered signal exceeds the pressure spike threshold, however, then a fault operation 1214 triggers a response process, such as response process 500 of FIG. 7. In accordance with one aspect, the fault operation 1214 determines the leak constitutes a disabling fault. The leak detection process 1200B performs any appropriate completion procedures and ends at a stop module 1216.

Figure 15C:
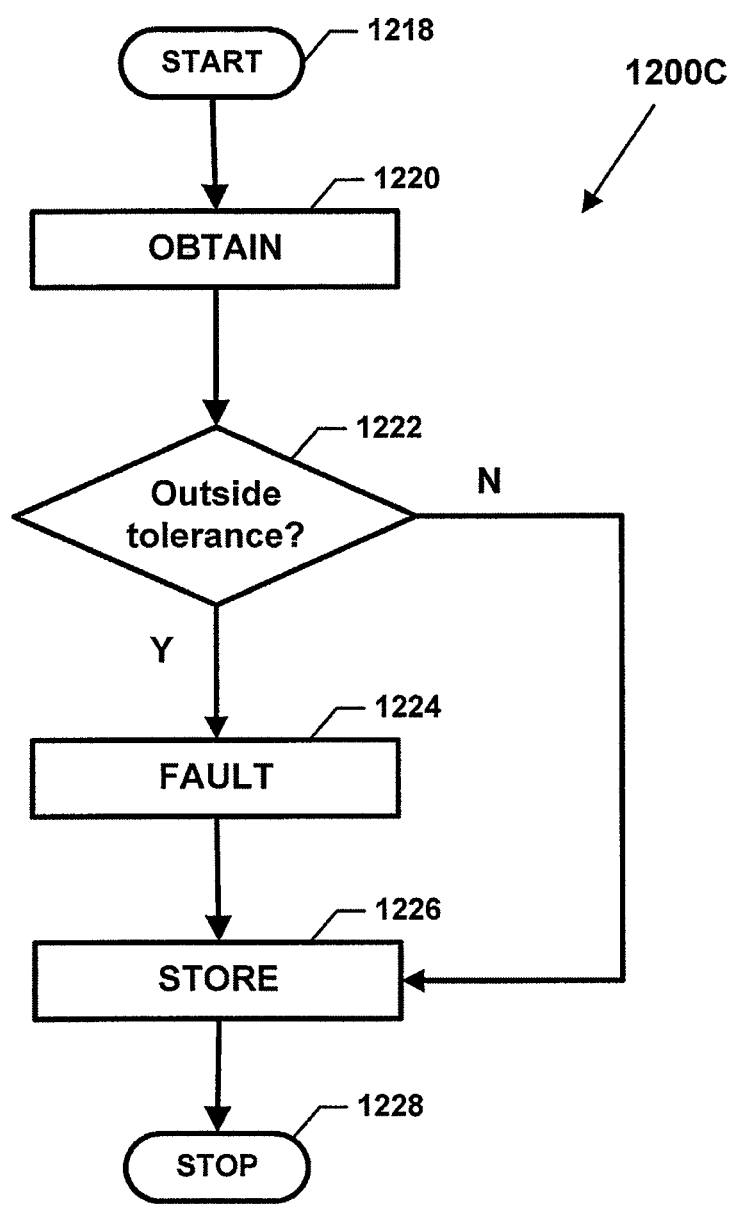
FIG. 15C is a flowchart illustrating an operational flow for an example monitoring process by which a barrel leak, such as a barrel leak in a pump assembly, can be monitored in accordance with the principles of the present disclosure.

FIG. 15C is a flowchart illustrating an example monitoring process 1200C by which changes in filter pressure spikes can be mapped over time to monitor changes in pump behavior. In accordance with some implementations, the monitoring process 1200C continues the leak detection process 1200A, 1200B of FIGS. 15A, 15B. For example, in one implementation, the monitoring process 1200C can be implemented if the second determination module 1212 determines the filter pressure signal is within tolerated ranges (e.g., is below the threshold) before cycling back to the beginning of the process. In another implementation, the monitoring process 1200C can be implemented after the fault operation 1214 is triggered.

The monitoring process 1200C performs any appropriate initialization procedures, begins at the start module 1218, and proceeds to an obtain operation 1220. The obtain operation 1220 determines whether a previous pressure spike value was stored in memory, e.g., memory 167 of the second power source control system 152 of FIG. 3). If such a value was stored, then the obtain operation 1220 pulls the value from memory. In some implementations, the obtain operation 1220 pulls one or more discrete pressure spike values stored in memory. In other implementations, the obtain operation 1220 pulls a running average value based on previously stored values.

A determination module 1222 compares the filtered data signal obtained in the leak detection processes 1500A, 1500B to the stored pressure spike values. If the determination module 1222 determines that the pressure spikes of the filtered data signal deviate by a threshold amount from the stored values for the pressure spikes, then a fault operation 1224 is triggered. In one implementation, the fault operation 1224 triggers a response process, such as response process 500 of FIG. 7.

A store operation 1226 stores the value of the pressure spikes of the filtered data signal, e.g., in memory 167 of the second power source control system 152 of FIG. 3). In some implementations, the storage operation 1226 uses the value(s) from the filtered data signal to calculate a running average based on values already stored in memory. The monitoring process 1200C performs any appropriate completion procedures and ends at a stop module 1228.

If the determination module 1222 determines that the pressure spikes of the filtered data signal do not deviate by a threshold amount from the stored values for the pressure spikes, then the monitoring process 1200C may proceed to the store operation 1226. In other implementations, however, the monitoring process 1200C may proceed directly to the stop module 1228 instead.

In accordance with some aspects, the monitoring process 1200C may be used to determine when the performance of the pump begins to decline over time, even if the performance has not yet degraded sufficiently to trigger a fault. In accordance with other aspects, the monitoring process 1200C may be used to map the performance of the pump over time to aid in providing a prognosis for the pump.

Figure 16:
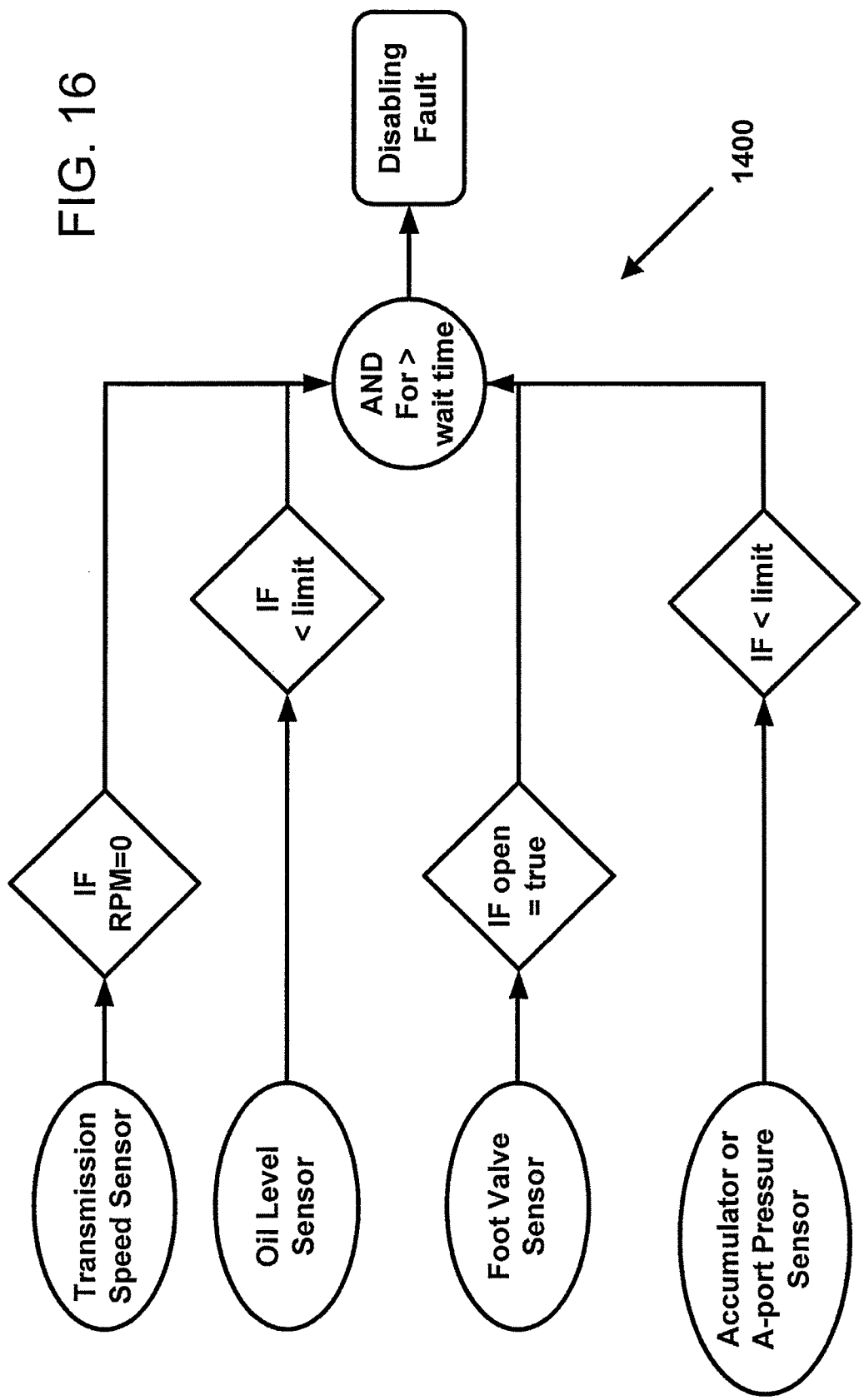
FIG. 16 is a block diagram illustrating an example detection process by which a low fluid (e.g., oil) level can be determined in accordance with the principles of the present disclosure.

FIG. 16 is a block diagram illustrating one example detection process 1400 by which a low fluid (e.g., oil) level can be determined. In accordance with some aspects, the detection process 1400 receives input from a transmission output speed sensor, an oil level sensor, a foot valve sensor, and an accumulator pressure sensor. When the transmission output speed is equal to about zero RPM and the foot valve sensor indicates the foot valve, such as foot valve 236 of FIG. 2, is open, the detection process 1400 determines whether the accumulator pressure sensor and the oil level sensor in the reservoir both indicate fluid levels below predetermined thresholds for a predetermined period of time. In accordance with one aspect, a fault condition resulting from detection process 1400 is a disabling fault.

Figure 17:
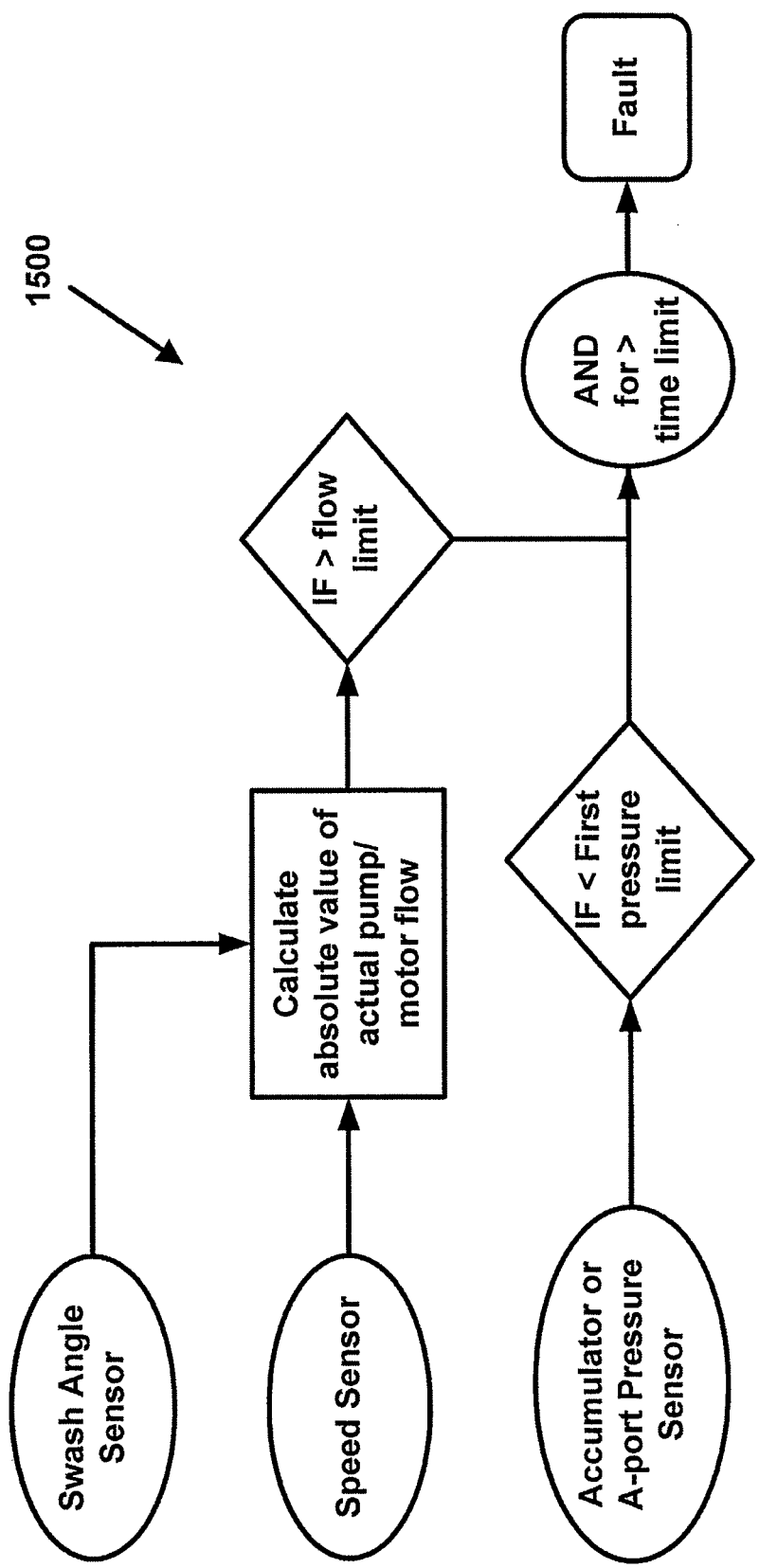
FIG. 17 is a block diagram illustrating an example bypass valve failure detection process by which a malfunction in the bypass valve can be determined in accordance with the principles of the present disclosure.

FIG. 17 is a block diagram illustrating an example bypass valve failure detection process 1500 by which a malfunction in the bypass valve can be determined. The detection process 1500 looks at actual calculated flow and posts a fault if the pump does not reach an appropriate pressure within a predetermined period of time (e.g., about 10 seconds).

In accordance with some aspects, the detection process 1500 receives input from a swash angle sensor, a pump rotation speed sensor, and an accumulator pressure sensor. The data received from the swash angle sensor and the pump rotation speed sensor enable the calculation of an absolute value of the pump/motor flow. For example, the pump/motor flow can be calculated using the following formula:

pump/motor flow=[(displacement at max swash angle) *(rotation speed)*tan(actual swash angle)]/ (231*tan(max swash angle)

The detection process 1500 determines a latching fault condition has occurred when the calculated flow exceeds a predetermined limit and the pressure in the accumulator fails to reach a predetermined threshold for a predetermined period of time. The detection process 1500 determines a disabling fault condition has occurred when the latching fault condition is detected more than a set number of times (e.g., five or more times). In accordance with one aspect, the number of times which a latching fault condition is detected can be stored in memory, such as volatile memory 168 of FIG. 3.

Figure 18:
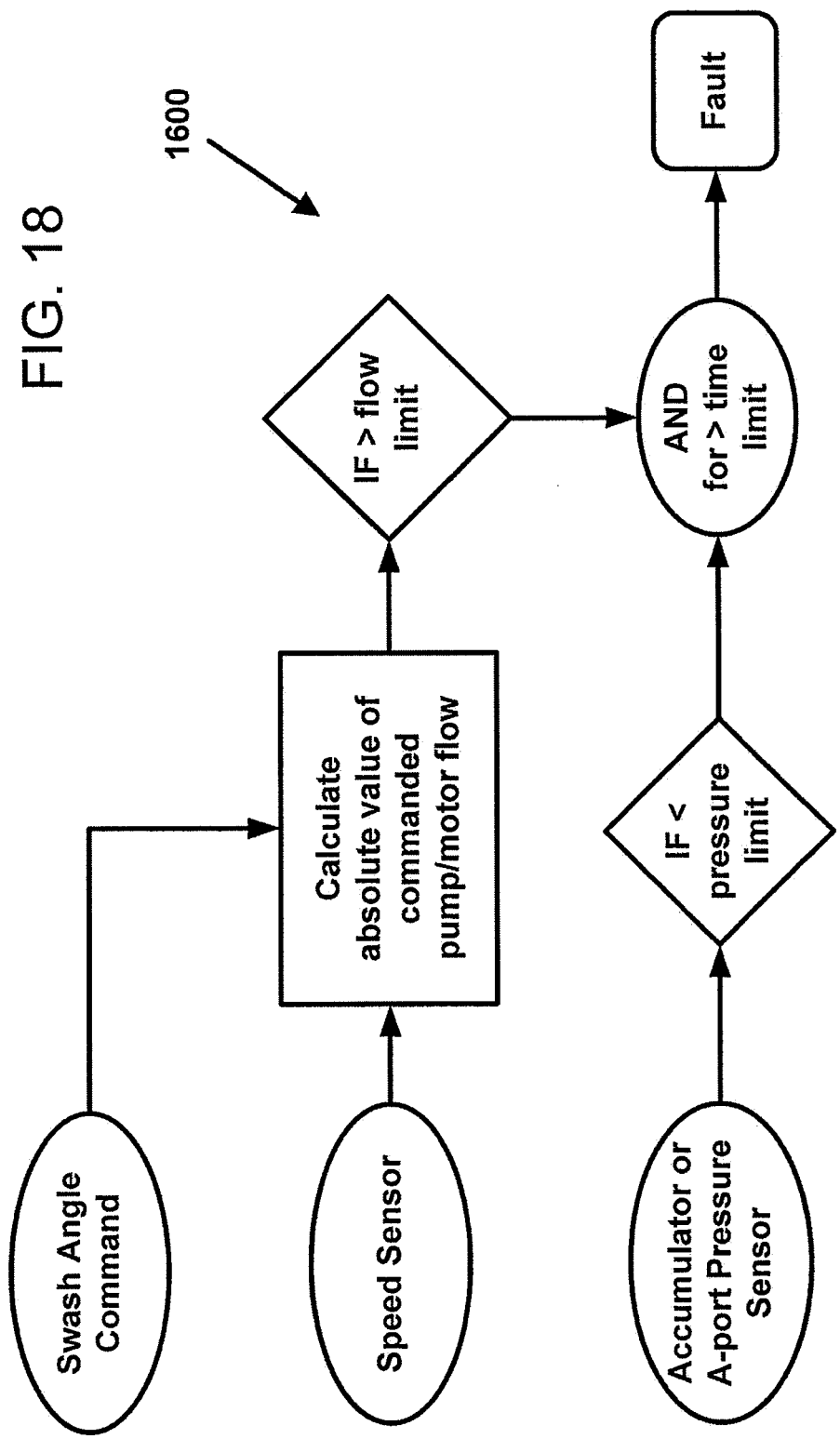
FIG. 18 is a block diagram illustrating an example bootstrap failure detection process by which a failure to gain swash plate control can be detected in accordance with the principles of the present disclosure.

FIG. 18 is a block diagram illustrating an example bootstrap failure detection process 1600 by which a malfunction in the bypass valve can be determined. The detection process 1600 looks at the commanded calculated flow and posts a fault if the pump does not reach an appropriate pressure within a predetermined period of time (e.g., about 10 seconds).

In accordance with some aspects, the detection process 1600 receives input from a pump rotation speed sensor and an accumulator pressure sensor. The detection process 1600 also determines the most recent command sent to the swash control valve. An absolute value of the pump/motor flow can be calculated based on the pump rotation speed and the angle at which the swash plate is commanded to be arranged. For example, the pump/motor flow can be calculated using the following formula:

=[(displacement at max swash angle)*rotation speed*tan(commanded swash angle)]/(231*tan (Max swash angle)

The detection process 1600 determines a latching fault condition has occurred when the calculated flow exceeds a predetermined limit and the pressure in the accumulator fails to reach a predetermined threshold for a predetermined period of time. The detection process 1600 determines a disabling fault condition has occurred when the latching fault condition is detected five or more times. In accordance with one aspect, the number of times which a latching fault condition is detected can be stored in memory, such as volatile memory 168 of FIG. 3.

Figure 19:
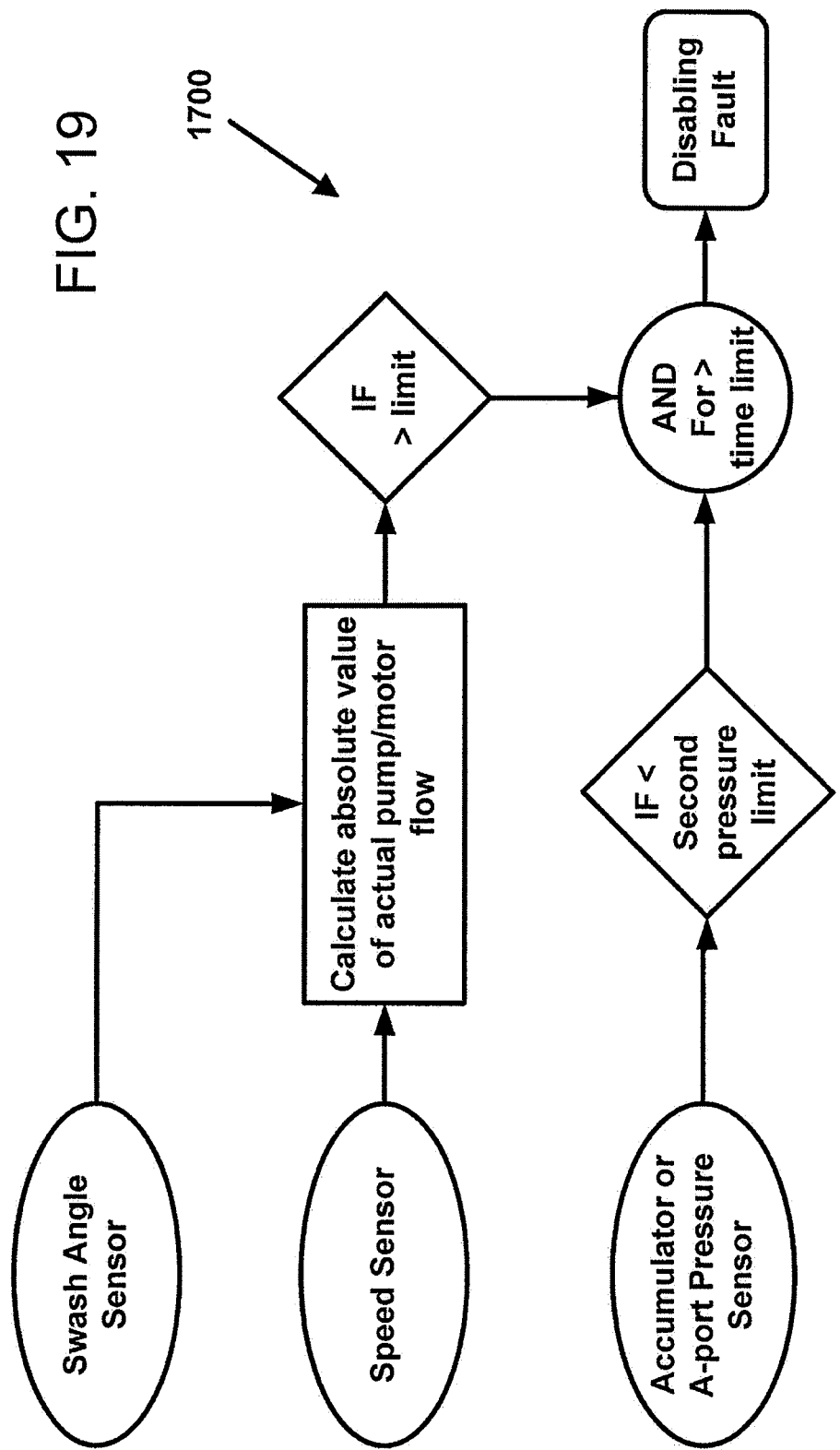
FIG. 19 is a block diagram illustrating an example pump/motor failure detection process by which a malfunction in the pump can be determined in accordance with the principles of the present disclosure.

FIG. 19 is a block diagram illustrating an example pump/motor failure detection process 1700 by which a malfunction in the pump can be determined. In accordance with some aspects, the detection process 1700 receives input from a swash angle sensor, a pump rotation speed sensor, and an accumulator pressure sensor. An absolute value of the pump/motor flow can be calculated based on the formula provided with respect to FIG. 17.

The detection process 1700 determines a disabling fault condition has occurred when the calculated flow exceeds a predetermined limit and the pressure in the accumulator fails to reach a predetermined threshold for a predetermined period of time. In accordance with one aspect, the predetermined threshold for the accumulator pressure is lower than the predetermined threshold used by detection process 1500 to determine a bypass valve failure.

Figure 20:
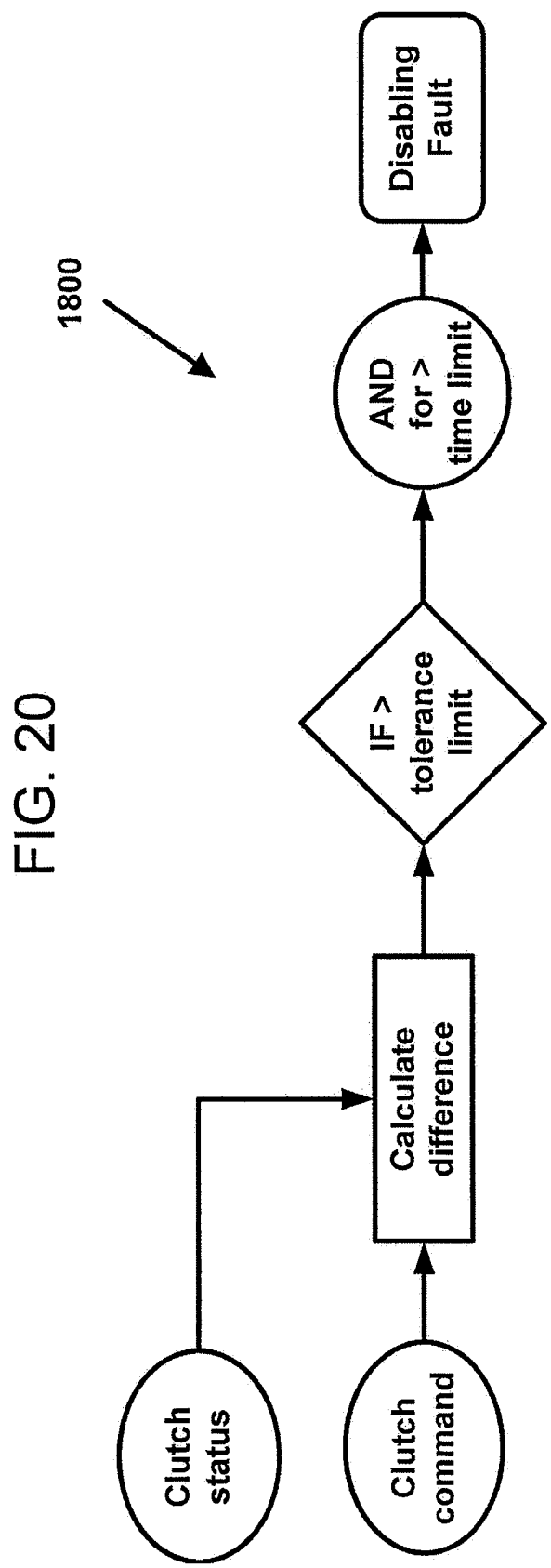
FIG. 20 is a block diagram illustrating an example failure to disengage detection process by which a failure in the transfer case to disengage the second power source from the vehicle drive assembly can be determined in accordance with the principles of the present disclosure.

FIG. 20 is a block diagram illustrating an example failure to disengage detection process 1800 by which a failure in the transfer case to disengage the second power source 124 from the vehicle can be determined. In accordance with some aspects, the detection process 1800 receives input from the clutch valve sensor. The detection process 1800 also determines the most recent command forwarded to the clutch valve. The detection process 1800 determines a disabling fault has occurred when the difference between the commanded clutch status and the actual clutch status differ by a threshold amount for greater than a predetermined period of time. In accordance with one aspect, the detection process 1800 triggers a speed limit process in response to detecting the disabling fault condition.

Figure 21:
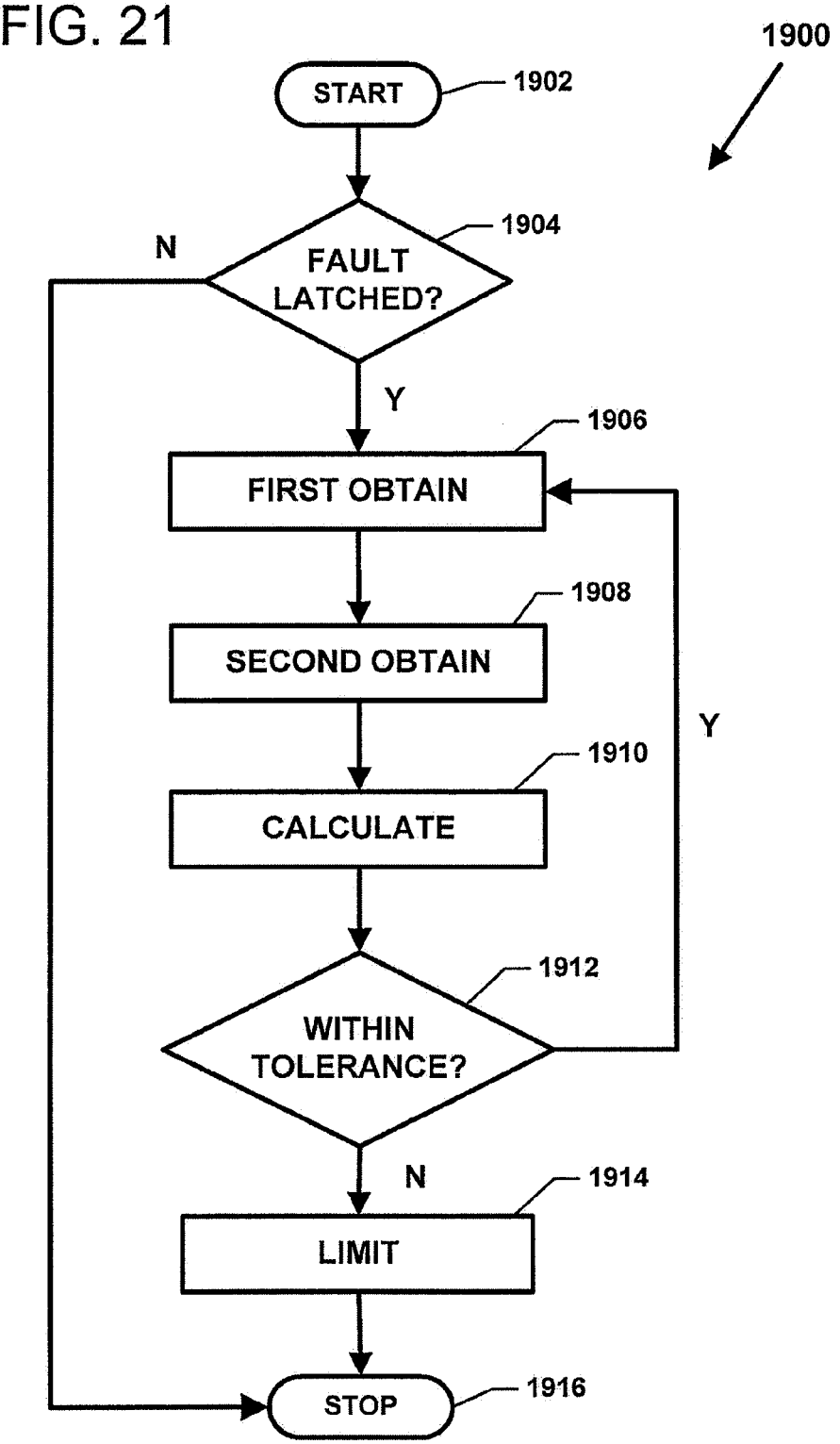
FIG. 21 is a block diagram illustrating an example speed limit process by which the speed of the engine can be limited to mitigate damage to the second power source in the event of a failure in the transfer case in accordance with the principles of the present disclosure.

FIG. 21 is a flowchart illustrating an operational flow for an example speed limit process 1900 by which the speed of the engine can be limited to mitigate damage to the second power source in the event of a failure in the transfer case. In general, the speed limit process 1900 sends an appropriate speed limit command (e.g., a J1939 command) to the engine to prevent the pump from spinning too quickly if the second power source 124 fails to disengage from the first power source.

The speed limit process 1900 performs any appropriate initialization procedures, begins at a start module 1902, and proceeds to a first determination module 1904. The first determination module 1904 determines whether a failure to disengage fault has been triggered. For example, in one implementation, the first determination module 1904 checks whether such a fault is stored in the non-volatile memory 167 of the second power source control system 152 of FIG. 3. An example process by which such a fault can be triggered is discussed above with reference to FIG. 20. Of course, the fault can be stored in other types or forms of electronic memory.

If the first determination module 1904 determines that no such fault has been triggered, then the speed limit process 1900 performs any appropriate completion procedures and ends at a stop module 1916. If the first determination module 1904 determines that a failure to disengage fault has been triggered, however, then the speed limit process 1900 proceeds to a first obtain operation 1906. The first obtain operation 1906 receives a data signal representing the pump speed (e.g., in RPMs). For example, the first obtain operation 1906 can obtain the data signal from a pump speed sensor, such as speed sensor 217 of FIG. 2.

The second obtain operation 1908 receives a data signal representing the gear ratio of the pump. For example, in one implementation, the second obtain operation 1908 can receive the data signal from the processor 166 and non-volatile memory 167 of the second power source control system 152 of FIG. 3. In another example implementation, the second obtain operation 1908 can receive the data signal from the processor 160 and non-volatile memory 161 of the prime mover control unit 154 of FIG. 3. In other implementations, the second obtain operation 1908 can receive the gear ratio data signal from a user input or via an upload signal from a remote computer.

A calculate operation 1910 determines a maximum allowable engine speed for when the second power source is engaged with the vehicle. In some implementations, the calculate operation 1910 determines the maximum allowable engine speed based at least partially on the obtained gear ratio. In certain implementations, the calculate operation 1910 determines the maximum allowable engine speed based at least partially on the obtained pump speed. For example, in one implementation, the calculate operation 1910 can calculate the maximum allowable engine speed in accordance with the following formula:

$$=\text{Maximum allowable transmission output speed} * \text{Gear Ratio}$$

In other implementations, the calculate operation 1910 determines the maximum allowable engine speed by retrieving a stored value from memory, such as non-volatile memory 167 or non-volatile memory 161 of FIG. 3.

A second determination module 1912 determines whether the pump is moving faster than the calculated maximum allowed speed. If the second determination module 1912 determines that pump is not moving faster, than the speed limit process 1900 returns to the first obtain operation 1904 to monitor the current pump speed. If the second determination module 1912 determines that pump is moving faster than the allowed maximum speed, however, than the speed limit process 1900 proceeds to a limit operation 1914.

The limit operation 1914 sends an appropriate command to limit the speed of the engine. For example, the limit operation 1914 sends the limit command via the communications network 184. In one implementation, the limit operation 1914 sends a J1939 command to the engine. The speed limit process 1900 performs any appropriate completion procedures and ends at the stop module 1916.

Figure 22:
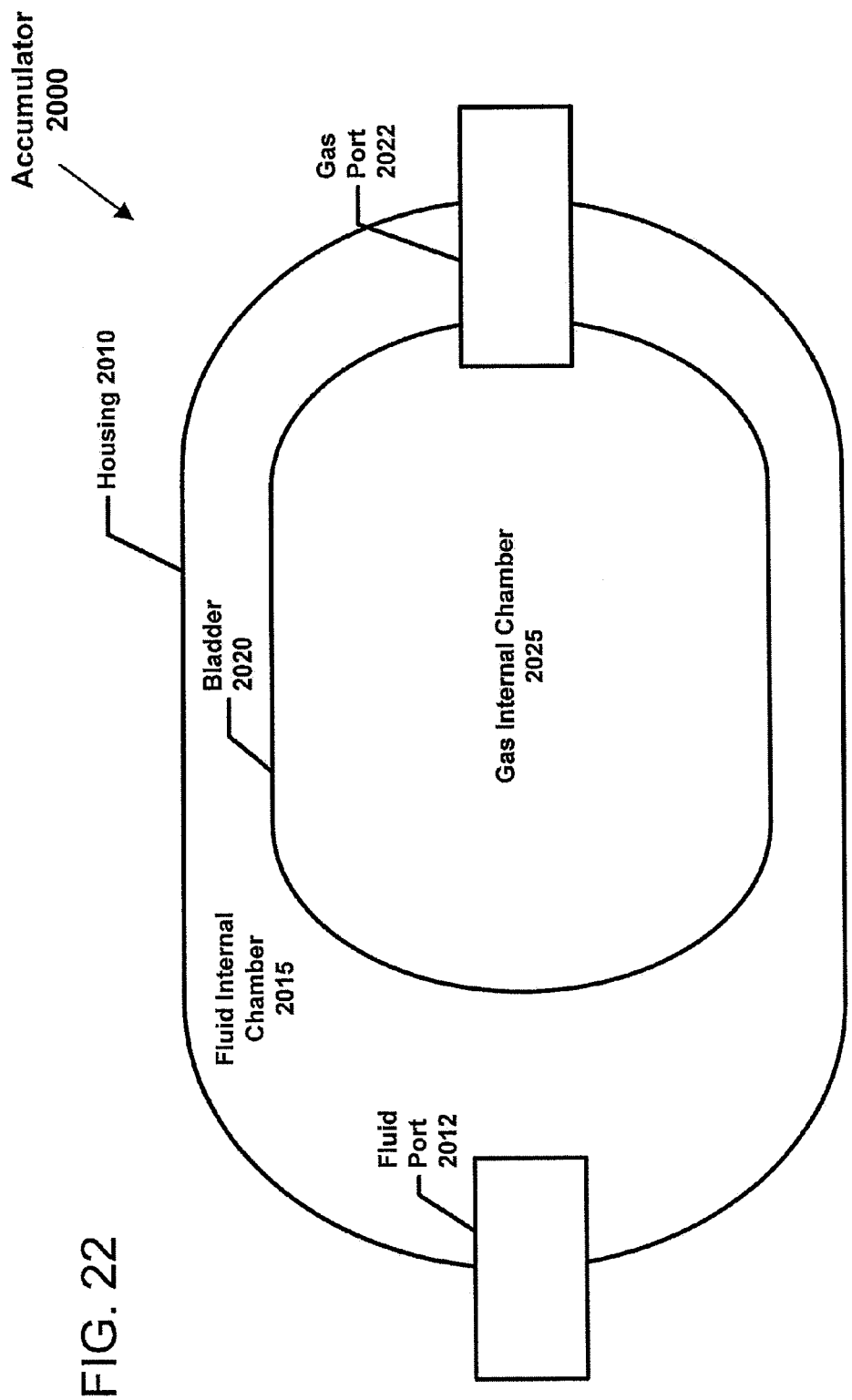
FIG. 22 shows an example hydraulic accumulator configured in accordance with the principles of the present disclosure.

FIG. 22 is a schematic diagram of an example hydraulic accumulator 2000 that is suitable for use as the high pressure accumulator 146 of FIG. 2. The hydraulic accumulator 2000 includes a rigid outer shell (or "housing") 2010 defining an internal chamber. A separator 2020 divides the internal chamber into a liquid chamber 2015 and a gas chamber 2025. As noted above, oil can be transferred between the reservoir 144 and the liquid chamber 2015 of the accumulator 146 (e.g., via a high pressure valve). Gas within the gas chamber 2025 can be received through a gas pressure valve. In some implementations, the gas is some form of a relatively inert gas, such as a nitrogen gas. Although it should be understood that the present disclosure is not limited to the use of any particular type of gas.

In some implementations, the housing 2010 includes a hydraulic port and conduit 2012 through which the liquid chamber 2020 communicates with components outside the accumulator. In various implementations, the hydraulic port and conduit may or may not contain a valve assembly. In some example implementations, the internal gas chamber 2025 is able to receive high pressure gas from a source of pressurized gas, e.g., through a gas port 2022 and a gas charging valve. In other example implementations, however, the accumulator 2000 may include only one of hydraulic valve or the gas valve. Implementations of the present disclosure are not limited to any particular type of hydraulic valve or gas valve, or even to the presence of either of such valves.

In certain implementations, the separator 2020 between the liquid chamber 2015 and the gas chamber 2025 may include a piston (e.g., sealed by an elastomeric sealing ring). In other implementations, the separator 2020 may include some sort of bellows arrangement. In still other implementations, the separator 2020 includes an elastomeric bladder. Some example materials used to form such bladders are permeable, or at least "semi-permeable" (i.e., the material does, over a period of time, permit some of the nitrogen gas to pass through the bladder material into the adjacent liquid chamber). In one example implementation, the bladder 2020 is formed from nitrile rubber.

One process by which a gas leak from the internal gas chamber 2025 may be detected includes monitoring the temperature and pressure of the gas within the bladder 2020. In accordance with some implementations, however, leakage of the gas from the internal gas chamber 2020 is not detected based on measured characteristics of the gas. Indeed, in some implementations, the accumulator 2000 does not include at least one of a gas pressure sensor and a gas temperature sensor within the bladder 2020 of the accumulator 2000. In accordance with certain aspects, the accumulator 2000 includes neither a gas pressure sensor nor a gas temperature sensor within the bladder 2020 of the accumulator.

Figure 23:
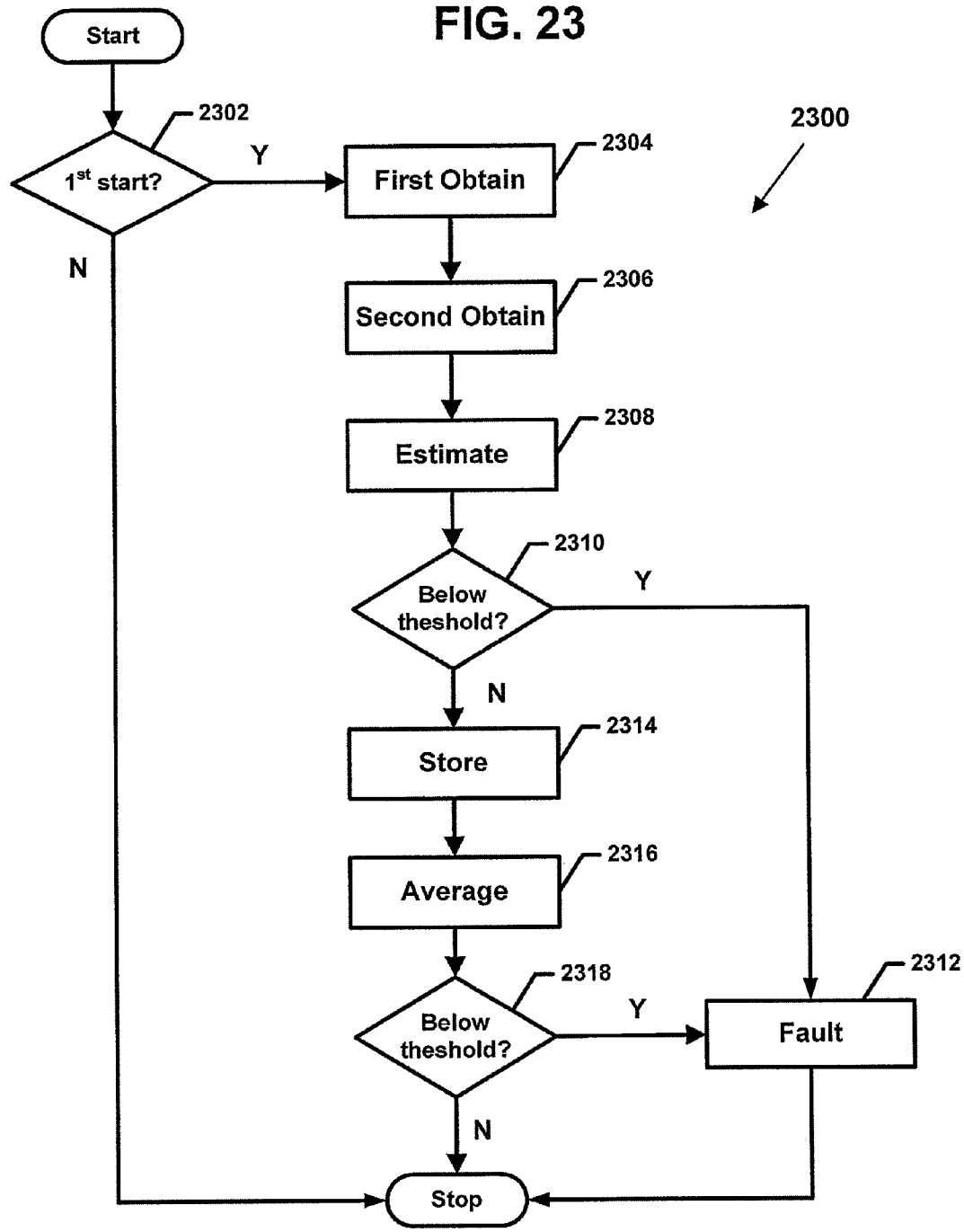
FIG. 23 is a flowchart illustrating an operational flow for an example gas leak detection process by which a gas leak in the accumulator can be detected in accordance with the principles of the present disclosure.

FIG. 23 is a flowchart illustrating an operational flow for an example gas leak detection process 2300 by which a gas leak in the accumulator can be detected. For example, the gas leak detection process 2300 can determine whether gas is leaking from the gas chamber 2025 of the accumulator 2000 of FIG. 22. In accordance with some aspects, the gas leak detection process 2300 detects gas leaks without directly measuring characteristics of the gas. For example, in certain implementations, the gas leak detection process 2300 detects gas leaks without directly measuring the temperature and/or pressure of the gas.

Generally, the gas leak detection process 2300 is performed only when the second power source system is started (e.g., each day or after some period of rest). Accordingly, the gas leak detection process 2300 performs any appropriate initialization procedures, begins at a start module, and proceeds to a first determination module 2302. The first determination module 2302 determines whether or not the accumulator has been newly started.

Figure 24:
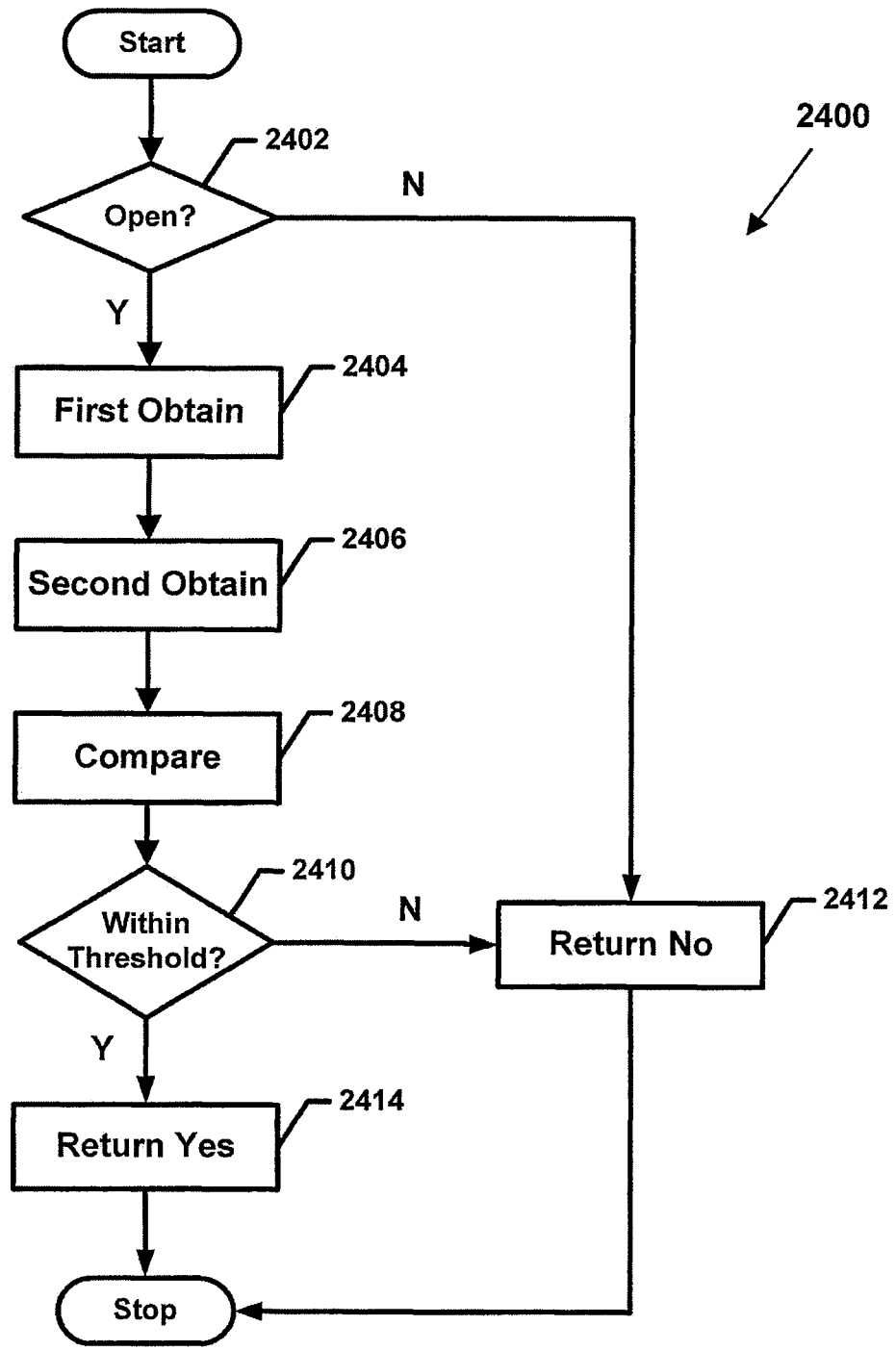
FIG. 24 is a flowchart illustrating an operational flow for an example initialization check process by which the gas leak detection process can determine whether the system has been recently initialized in accordance with the principles of the present disclosure.

If the first determination module 2302 determines the accumulator has been newly started, then the gas leak process 2300 proceeds to the first obtain operation 2304. If the first determination module 2302 determines the accumulator has not been newly started, however, then the gas leak process 2300 performs any appropriate completion procedures and ends at a stop module. One example process by which the first determination module 2302 can make the determination is shown in FIG. 24.

In accordance with one aspect, the first obtain operation 2304 receives a data signal from a liquid temperature sensor. For example, in one implementation, the first obtain operation 2304 can receive the data signal from the reservoir temperature sensor 212 of FIG. 2. The data signal represents the temperature of the liquid (e.g., oil) in the reservoir, such as reservoir 144 of FIG. 2. This liquid is transferred to the fluid chamber of the accumulator, such as fluid chamber 2015 of accumulator 2000 of FIG. 22. In other implementations, the first obtain operation 2304 can receive the data signals from any temperature sensor configured to measure the temperature of the liquid that flows between the reservoir and the accumulator.

A second obtain operation 2306 receives a data signal from a fluid pressure sensor in the accumulator. For example, in one implementation, the second obtain operation 2306 receives the data signal from the accumulator pressure sensor 215 of FIG. 2. The data signal represents the pressure of the liquid (e.g., oil) within the accumulator. For example, in one implementation, the data signal represents the pressure of the liquid within the fluid chamber 2015 of the accumulator 2000 of FIG. 22. In other implementations, the second obtain operation 2306 can receive the data signals from any pressure sensor configured to measure the pressure of the liquid that flows between the reservoir and the accumulator.

An estimate operation 2308 calculates the pressure of the gas within the accumulator, such as the nitrogen within the internal gas chamber 2025 of the accumulator 2000 of FIG. 22. For example, in some implementations, the estimate operation 2308 calculates the pressure of the gas within the accumulator based on the pressure of the fluid within the accumulator. In such implementations, the estimate operation 2308 determines an approximated gas pressure based on the data signals received in the second obtain operation 2306.

In certain implementations, the estimate operation 2308 determines what the pressure of the gas in the accumulator would be at a particular temperature. For example, in one implementations, the estimate operation 2308 determines what the pressure of the gas in the accumulator would be if the gas temperature was about 20° C. Of course, the estimate operation 2308 can calculate the pressure at any desired temperature. The estimate operation 2308 can make the determination based on the measured fluid temperature and the measured fluid pressure of the fluid in the reservoir or the liquid chamber of the accumulator. For example, the estimate operation 2308 can back calculate the pressure of the liquid based on the data signals received in the first and second obtain operations 2302, 2304. From the back calculated liquid pressure, the estimate operation 2308 can approximate the gas pressure at the desired temperature.

A second determination module 2310 determines whether the approximated gas pressure is within tolerated values. In some implementations, the second determination module 2310 can determine whether the approximated gas pressure is less than a predetermined threshold value at a particular temperature. In certain implementations, the threshold value is set based on the standard operating pressure for the particular accumulator, which may be experimentally determined. In some implementations, the second determination module 2310 compares the back calculated estimated gas pressure to the threshold value. In accordance with some aspects, the temperature to which the estimate operation 2308 back calculates the gas pressure is based on the threshold value.

In some implementations, the threshold value for the second determination module 2310 is based on a percentage value of the standard operating gas pressure at a standard operating temperature for the particular accumulator. For example, in certain implementations, the second determination module 2318 determines whether the approximated pressure is within 10% of the standard operating range for the particular accumulator. In other implementations, the second determination module 2310 determines whether the approximated pressure is within 15% of the standard operating range. In still other implementations, the second determination module 2318 determines whether the approximated pressure is within 20% of the standard operating range. In still other implementations, the second determination module 2318 determines whether the approximated pressure is within 25% of the standard operating range. For example, in certain implementations, the standard operating pressure for gas in the accumulator is about 124 bar at 20° C. In one such implementation, the second determination module 2310 determines whether the approximated gas pressure is less than or equal to about 100 bar at 20° C.

If the second determination module 2310 determines that the approximated gas pressure is outside the tolerated values for gas pressure, then the gas leak detection process 2300 triggers a fault operation 2312. For example, the second determination module 2310 can determine that the approximated gas pressure is below the set threshold value. The fault operation 2312 triggers a response process, such as response process 500 of FIG. 7. In accordance with one aspect, the fault operation 2312 determines the leak constitutes a disabling fault. The leak detection process 2300 performs any appropriate completion procedures and ends at a stop module.

If the second determination module 2310 determines that the approximated gas pressure is within the tolerated values for gas pressure (e.g., is not below a set threshold), then the gas leak detection process 2300 proceeds to a store operation 2314. The store operation 2314 saves the approximated gas pressure value in memory, such as non-volatile memory 167 of the second power source (see FIG. 3). In certain implementations, the store operation 2314 also erases a previously stored value, such as the oldest gas pressure value stored in memory. In other implementations, the store operation 2314 does not erase stored values.

An average operation 2316 calculates a running average of the estimated gas pressure values stored in memory. In some implementations, the average operation 2316 can calculate a running average based on the most recent values stored in memory. For example, in one implementation, the average operation 2316 calculates a running average of the last five approximated gas pressure values stored in memory. In other implementations, however, the average operation 2316 can make the calculation based on the most recent three values, eight values, ten values, fifteen values, twenty values, fifty values, etc.

A third determination module 2318 determines whether the running average of the approximated gas pressure values is within tolerated values. In some implementations, the third determination module 2318 can determine whether the running average is less than a predetermined threshold associated with a particular temperature. In certain implementations, the tolerated values for the running average are closer to desired operating parameters than the tolerated values used by the second determination module 2310.

In some implementations, the threshold value for the third determination module 2318 is based on a percentage value of the standard operating gas pressure at a standard operating temperature for the particular accumulator. For example, in certain implementations, the third determination module 2318 determines whether the running average is within 10% of the standard operating range for the particular accumulator. In other implementations, the third determination module 2318 determines whether the running average is within 5% of the standard operating range. In still other implementations, the third determination module 2318 determines whether the running average is within 15% of the standard operating range. In still other implementations, the third determination module 2318 determines whether the running average is within 20% of the standard operating range. For example, in one implementation, the third determination module 2318 determines whether the running average of the approximated gas pressure values is less than about 115 bar at 20° C. when the standard operating value is about 124 bar at 20° C.

If the third determination module 2318 determines that the running average is outside the tolerated values, then the gas leak detection process 2300 triggers the fault operation 2312. For example, the third determination module 2318 can determine that the running average is below the set threshold value. The fault operation 2312 triggers a response process, such as response process 500 of FIG. 7. In one implementation, the fault operation 2312 determines the leak constitutes a disabling fault. In another implementation, the fault operation 2312 determines the leak constitutes a latching fault. In another implementations, the fault operation 2312 issues a service indicator without otherwise triggering a fault response. The leak detection process 2300 performs any appropriate completion procedures and ends at a stop module.

If the third determination module 2318 determines that the running average is within the tolerated values for gas pressure (e.g., is not below a set threshold), then the gas leak detection process 2300 ends at the stop module without triggering the fault operation 2312.

FIG. 24 is a flowchart illustrating an operational flow for an example initialization check process 2400 by which the gas leak detection process 2300 can determine whether the system has been recently initialized. The initialization check process 2400 performs any appropriate initialization procedures, begins at a start module, and proceeds to a first determination module 2402, which determines whether the foot valve, such as foot valve 236 of FIG. 2, has changed state to an open position.

If the foot valve has not changed state or is not open, then the initialization check process 2400 proceeds to a first return operation 2412 that returns a value of "no" or false. The initialization check process 2400 performs any appropriate completion procedures and ends at a stop module. If the first determination module 2402 determines the foot valve has changed state to open, however, then the initialization check process 2400 proceeds to a first obtain operation 2402.

The first obtain operation 2402 receives a data signal from a first temperature sensor indicating the temperature of the pump case. For example, the first obtain operation 2402 can receive a data signal from the case temperature sensor 218. A second obtain operation 2404 receives a data signal from a second temperature sensor indicating the temperature of the fluid reservoir, such as fluid reservoir 144 (see FIGS. 1 and 2). For example, the second obtain operation 2404 can receive a data signal from the reservoir temperature sensor 212.

A compare operation 2406 determines the difference between the data signals received in the first and second obtain operations 2402, 2404. A second determination module 2408 determines whether the difference calculated by the compare operation 2406 is within a predetermined range. For example, in one implementation, the second determination module 2408 determines whether the temperature of the pump case and the temperature of the fluid reservoir are within 10 degrees of each other. In other implementations, the second determination module 2408 can determine whether the case temperature and the reservoir temperature are within two degrees, five degrees, eight degrees, fifteen degrees, twenty degrees, etc. of each other.

If the second determination module 2408 determines that the temperature of the case is different from the fluid reservoir temperature, then the initialization check process 2400 proceeds to the first return operation 2412 that returns a value of "no" or false. If the second determination module 2408 determines that the temperature of the case is within a tolerated range from the fluid reservoir temperature, then the initialization check process 2400 proceeds to a second operation 2414 that returns a value of "Yes" or true. The initialization check process 2400 performs any appropriate completion procedures and ends at a stop module.

Figure 25:
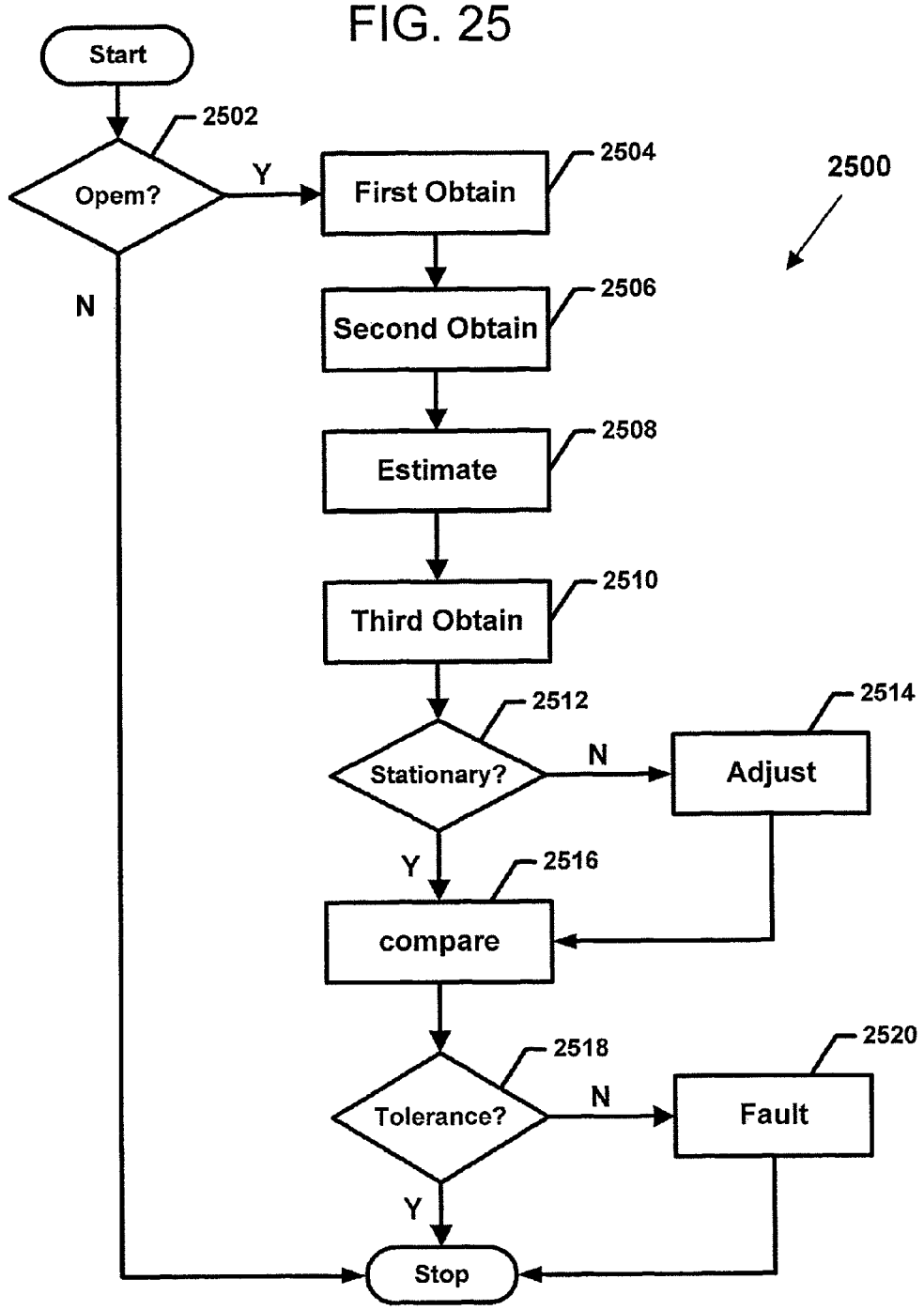
FIG. 25 is a flowchart illustrating an operational flow for an example fluid leak detection process can determine whether fluid (e.g., oil) is leaking from the second power system in accordance with the principles of the present disclosure.

FIG. 25 is a flowchart illustrating an operational flow for an example fluid leak detection process 2500 can determine whether fluid (e.g., oil) is leaking from the second power system. For example, the fluid leak detection process 2500 can detect fluid leaking from the reservoir, the liquid chamber of the accumulator, or a conduit system therebetween. In general, the fluid leak detection process 2500 compares a measured fluid level in the reservoir with an estimated fluid level. The fluid leak detection process 2500 performs any appropriate initialization procedures, begins at a start module, and proceeds to a first determination module 2502.

The first determination module 2502 determines whether or not the foot valve is open. For example, in one implementation, the first determination module 2502 can obtain a reading from the accumulation proximity sensor 216 of FIG. 2 that indicates whether a foot valve is open or closed. If the first determination module 2502 determines that the foot valve is not open, then the fluid leak detection process 2500 performs any appropriate completion procedures and ends at a stop module. If the first determination module 2502 determines that the foot valve is open, however, then the fluid leak detection process 2500 proceeds to a first obtain operation 2504.

The first obtain operation 2504 receives a data signal from a temperature sensor indicating a temperature of the fluid in the reservoir. For example, in one implementation, the first obtain operation 2504 can receive the data signal from the reservoir temperature sensor 212 of FIG. 2. The data signal represents the temperature of the liquid (e.g., oil) in the reservoir, such as reservoir 144 of FIG. 2. In other implementations, the first obtain operation 2504 can receive the data signals from any temperature sensor configured to measure the temperature of the liquid that flows between the reservoir and the accumulator.

A second obtain operation 2506 receives a data signal from a fluid pressure sensor in the accumulator. For example, in one implementation, the second obtain operation 2506 receives the data signal from the accumulator pressure sensor 215 of FIG. 2. The data signal represents the pressure of the liquid (e.g., oil) within the accumulator. For example, in one implementation, the data signal represents the pressure of the liquid within the fluid chamber 2015 of the accumulator 2000 of FIG. 22. In other implementations, the second obtain operation 2506 can receive the data signals from any pressure sensor configured to measure the pressure of the liquid that flows between the reservoir and the accumulator.

An estimate operation 2508 calculates an estimated fluid level within the accumulator. In accordance with some implementations, the estimate operation 2508 calculates the estimated fluid level based on the amount of fluid that should be in the reservoir and the readings obtained in the first and second obtain operations 2504, 2506.

A third obtain operation 2510 measures the actual fluid level in the reservoir. For example, in one implementations, the third obtain operation 2510 receives a data signal from the level sensor 211 of FIG. 2. The data signal represents the level of the fluid within the reservoir 144 of FIG. 2.

A second determination module 2512 determines whether the vehicle is moving. In accordance with aspects of the disclosure, fluid can slosh around the reservoir when the vehicle is moving. Accordingly, fluid level measurements taken when the vehicle is moving have a higher probability of being inaccurate than if the vehicle remains stationary during the readings. If the second determination module 2512 determines that the vehicle is not moving, then the fluid leak detection process 2500 proceeds to a compare operation 2516, which evaluates the measured fluid level and the estimated fluid level to determine a difference between the two values.

If the second determination module 2512 determines that the vehicle is moving, however, then the fluid leak detection process 2500 proceeds to an adjust operation 2514. The adjust operation 2514 increases the amount by which the measured fluid level can differ from the estimated fluid level. In certain implementations, the amount by which the adjust operation 2514 alters the measurements or tolerances depends on how movement of the vehicle affects the fluid in the reservoir. Accordingly, in certain implementations, the adjustment amount can be determined experimentally for a particular reservoir and/or accumulator.

In some implementations, the adjust operation 2514 alters the estimated fluid level up or down by a predetermined amount. For example, in one implementation, the adjust operation 2514 subtracts two gallons from the estimated fluid level before comparing the measured and estimated levels. In other implementations, the adjust operation 2514 subtracts one to five gallons from the estimated fluid level before comparing the measured and estimated levels. In still other implementations, the adjust operation 2514 can subtract less than one gallon (e.g., a quarter gallon, a half gallon, etc.).

In other implementations, the adjust operation 2514 increases the tolerance range for comparison. For example, in one implementation, the adjust operation 2514 can increase the tolerance range by about two gallons. In other implementations, the adjust operation 2514 adds one to five gallons to the tolerance range before comparing the measured and estimated levels. In still other implementations, the adjust operation 2514 can add less than one gallon (e.g., a quarter gallon, a half gallon, etc.) to the tolerance range. In some such implementations, the adjust operation 2514 is implemented before the compare operation 2516. In other implementations, however, the adjust operation 2514 can be implemented after the compare operation 2516.

A third determination module 2518 determines whether the estimated fluid level is sufficiently close to the measured fluid level in the reservoir. In some implementations, the third determination module 2518 determines whether the difference between the estimated fluid level and the measure fluid level is less than a predetermined threshold. In other implementations, the third determination module 2518 determines whether the difference between the adjusted estimate and the measured level is less than a predetermined threshold.

In some implementations, the threshold value is at least partially set based on the amount of tolerance in the system. For example, the threshold value can take into account the percent error in the fluid temperature readings, the percent error in the fluid pressure reading, and the percent error in the fluid level reading. In one implementation, the fluid temperature sensor may have a 2% error, the fluid pressure sensor may have a 1% error, and the fluid level sensor may have a 7% error. In one such implementation, the tolerance threshold value may be set at a value of at least 9% of the measured value. In other implementations, however, the tolerance threshold value may be set higher or lower percent tolerance.

In some implementations, the threshold value is at least partially set based on laws, regulations, or reporting guidelines. For example, the threshold value may be set at least partly based on EPA (the US Environmental Protection Agency) reporting guidelines. For example, in one implementation, the third determination module 2518 determines whether the difference between the estimated fluid level and the measure fluid level is less than about ten gallons. In another implementation, the third determination module 2518 determines whether the difference between the estimated fluid level and the measure fluid level is less than about five gallons. In another implementation, the third determination module 2518 determines whether the difference between the estimated fluid level and the measure fluid level is less than about three gallons. In another implementation, third determination module 2518 determines whether the difference between the estimated fluid level and the measure fluid level is less than about one gallon. In another implementation, third determination module 2518 determines whether the difference between the estimated fluid level and the measure fluid level is less than about one half gallon.

If the third determination module 2518 determines that the difference between the estimated fluid level and the measured fluid level is within a tolerated range, then the fluid leak detection process 2500 performs any appropriate completion procedures and ends at a stop module. If the third determination module 2518 determines the difference is outside the tolerated range, however, then the fluid leak detection process 2500 triggers fault operation 2520. The fault operation 2520 triggers a response process, such as response process 500 of FIG. 7. In accordance with one aspect, the fault operation 2520 determines the fluid leak constitutes a disabling fault. The fluid leak detection process 2500 performs any appropriate completion procedures and ends at a stop module.

Figure 26:
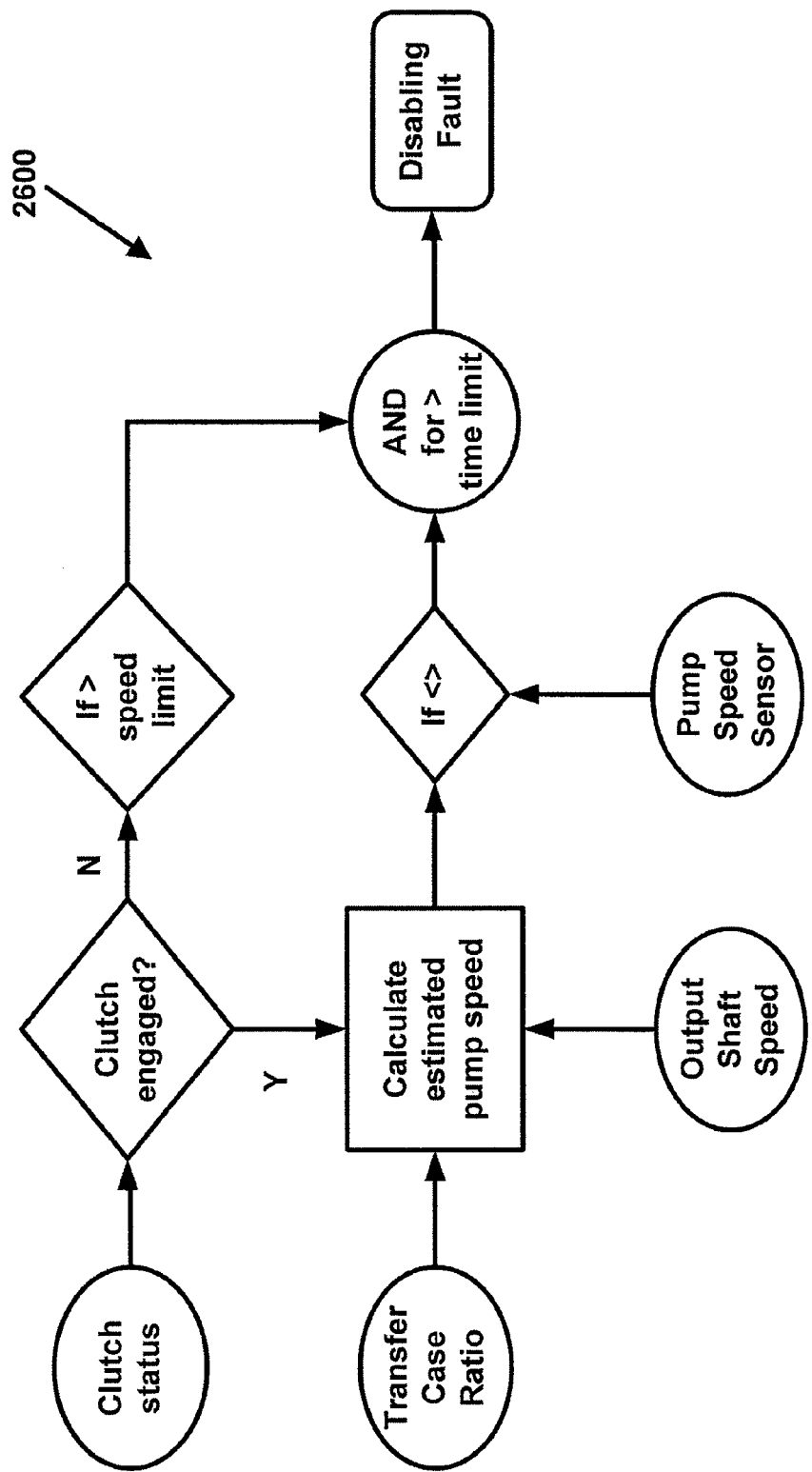
FIG. 26 is a block diagram illustrating another example failure to disengage detection process by which a failure in the transfer case to disengage the second power source from the vehicle can be determined in accordance with the principles of the present disclosure.

FIG. 26 is a block diagram illustrating another example failure to disengage detection process 2600 by which a failure in the transfer case to disengage the second power source 124 from the vehicle can be determined. In accordance with some aspects of the disclosure, the example failure to disengage detection process 2600 can be used as an alternative to the example failure to disengage detection process 1800 shown in FIG. 20. In accordance with other aspects of the disclosure, however, the example failure to disengage detection process 2600 can be used in combination with the example failure to disengage detection process 1800 of FIG. 20.

In general, the detection process 2600 determines if the pump is still pumping after the clutch has supposedly disengaged. The detection process 2600 also can determine if the difference between the pump speed and the output shaft speed are logically impossible. In accordance with some aspects, the detection process 2600 receives input from the clutch valve sensor to determine whether the clutch is engaged or disengaged.

The detection process 2600 also receives input from the pump speed sensor to determine the speed of the pump. The detection process 2600 also estimates a pump speed using the speed of the output shaft and the transfer case ratio. In one example implementation, the detection process 2600 obtains the output shaft speed from the engine controller via the CAN bus 184. For example, in one implementation, the detection process 2600 may use the following formula to compare the pump speed with the output shaft speed.

=|pump speed−(output shaft speed*transfer case ratio)|

The detection process 2600 triggers a fault when the clutch is engaged and the difference between the pump speed and comparable output shaft speed exceeds a tolerated amount for greater than a predetermined period of time. In various example implementations, the detection process 2600 can trigger a disabling fault when the tolerated speed limit is exceeded for about three seconds, five seconds, eight seconds, thirty seconds, one minute, two minutes, five minutes, or thirty minutes.

In some implementations, the detection process 2600 triggers a non-latching fault. In other implementations, the detection process 2600 triggers a latching fault. In still other implementations, the detection process 2600 triggers a disabling fault. In accordance with one aspect, the detection process 2600 triggers a speed limit process in response to detecting the disabling fault condition. In accordance with another aspect, the detection process 2600 triggers a service warning in response to detecting the fault condition.

The detection process 2600 also triggers a fault when the clutch status sensor indicates the clutch is disengaged and the pump speed exceeds a threshold speed for greater than a predetermined period of time. In various example implementations, the detection process 2600 can trigger a disabling fault when the speed threshold is exceeded for about three seconds, five seconds, eight seconds, fifteen seconds, thirty seconds, one minute, two minutes, or five minutes.

In some implementations, the detection process 2600 triggers a non-latching fault. In other implementations, the detection process 2600 triggers a latching fault. In still other implementations, the detection process 2600 triggers a disabling fault. In accordance with one aspect, the detection process 2600 triggers a speed limit process in response to detecting the disabling fault condition. In accordance with another aspect, the detection process 2600 triggers a service warning in response to detecting the fault condition.

Various modifications and alterations of this disclosure will become apparent to those skilled in the art without departing from the scope and spirit of this disclosure. For example, each flowchart presents an example sequence of operations. At least some of the operations of the flow charts can be performed in different sequences from those shown. It should be understood that the scope of this disclosure is not to be unduly limited to the illustrative embodiments set forth herein.

The invention claimed is:

1. A limit method for limiting a speed of an engine of a vehicle having a first power source and a second power source, the method comprising:
   determining that the vehicle has failed to disengage the second power source from the engine;
   obtaining a pump speed of a pump of the second power source;
   obtaining a gear ratio of the pump of the second power source;
   determining a maximum allowable pump speed based at least partially on the gear ratio; and
   sending a limit command to the engine of the vehicle if the obtained pump speed is greater than the maximum allowable pump speed.

2. The limit method of claim 1, wherein determining that the vehicle has failed to disengage the second power source from the engine comprises:
   obtaining a first data signal representing a command sent to a clutch of the engine;
   obtaining a second data signal representing a current status of the clutch;
   determining that the current status of the clutch does not sufficiently match the command sent to the clutch for at least a set period of time; and
   triggering a failure to disengage fault.

3. The limit method of claim 2, wherein the failure to disengage fault is a disabling fault.

4. The limit method of claim 2, further comprising storing the failure to disengage fault in non-volatile memory.

5. The limit method of claim 1, wherein the second power source includes a pump-motor assembly, a fluid reservoir, and an energy storage unit.

6. The limit method of claim 5, wherein the second power source includes an engagement assembly that is configured to selectively engage the pump-motor assembly to a drive line of the vehicle.

7. The limit method of claim 6, wherein the engagement assembly is configured to selectively engage the pump-motor assembly to the drive line during acceleration of the vehicle.

8. The limit method of claim 6, wherein the engagement assembly is configured to selectively engage the pump-motor assembly to the drive line during deceleration of the vehicle.

9. The limit method of claim 1, wherein the first power source includes an internal combustion engine.

10. The limit method of claim 1, wherein the pump speed is obtained using a pump speed sensor.

11. The limit method of claim 1, wherein each power source is operated by a respective control unit, each control unit including a processor and a memory for data storage.

12. The limit method of claim 11, wherein determining that the vehicle has failed to disengage the second power source from the engine comprises checking whether a failure to disengage fault is stored in the memory of the second power source.

13. The limit method of claim 11, wherein the control unit of the second power source is configured to limit a torque output of the first power source when the second power source is actively engaged to a drive line by which the second power source couples to a drive line.

14. The limit method of claim 11, wherein the gear ratio is obtained from the memory of the second power source.

15. The limit method of claim 11, wherein the gear ratio is obtained from the memory of the first power source.

16. The limit method of claim 1, wherein the gear ratio is obtained from user input.

17. The limit method of claim 1, wherein the gear ratio is obtained from an upload signal from a remote computer.

18. The limit method of claim 1, wherein the second power source is configured to act as a motor during acceleration of the vehicle, and wherein the second power source is configured to act as a pump during deceleration of the vehicle.

19. The limit method of claim 1, further comprising warning the user of the failure to disengage fault.

20. The limit method of claim 1, wherein the engine remains limited even after the vehicle is keyed off and keyed on again.

* * * * *